(12) United States Patent
Kurokawa et al.

(10) Patent No.: US 11,004,374 B2
(45) Date of Patent: May 11, 2021

(54) DISPLAY UNIT, DISPLAY DEVICE, AND ELECTRONIC DEVICE

(71) Applicant: Semiconductor Energy Laboratory Co., Ltd., Atsugi (JP)

(72) Inventors: Yoshiyuki Kurokawa, Kanagawa (JP); Kei Takahashi, Kanagawa (JP); Kensuke Yoshizumi, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/500,503

(22) PCT Filed: Apr. 16, 2018

(86) PCT No.: PCT/IB2018/052612
§ 371 (c)(1),
(2) Date: Oct. 3, 2019

(87) PCT Pub. No.: WO2018/197985
PCT Pub. Date: Nov. 1, 2018

(65) Prior Publication Data
US 2020/0105176 A1    Apr. 2, 2020

(30) Foreign Application Priority Data

Apr. 27, 2017  (JP) .............................. JP2017-088830

(51) Int. Cl.
*G09G 3/3266*  (2016.01)
*G09G 3/20*    (2006.01)
(Continued)

(52) U.S. Cl.
CPC ............. *G09G 3/20* (2013.01); *G09G 3/3266* (2013.01); *G09G 3/3275* (2013.01);
(Continued)

(58) Field of Classification Search
CPC ...... G09G 3/20; G09G 3/3266; G09G 3/3275; G09G 2300/0871; G09G 2310/0202; G09G 2310/0286; G09G 2340/0435
See application file for complete search history.

(56) References Cited

U.S. PATENT DOCUMENTS

| 7,202,846 B2 | 4/2007 | Maeda et al. |
| 2002/0004413 A1 | 1/2002 | Inoue |

(Continued)

FOREIGN PATENT DOCUMENTS

| CN | 001424821 A | 6/2003 |
| CN | 101573745 A | 11/2009 |

(Continued)

OTHER PUBLICATIONS

International Search Report (Application No. PCT/IB2018/052612) dated Jul. 17, 2018.
(Continued)

*Primary Examiner* — Robert J Michaud
(74) *Attorney, Agent, or Firm* — Fish & Richardson P.C.

(57) ABSTRACT

A low-power display device in which an operation method is optimized in accordance with the resolution and the frame frequency of a content is provided.

The display device includes a display unit and an image receiving apparatus. In the case where the resolution of a content is lower than the resolution that can be displayed by the display device, a source driver and a gate driver included in the display unit output signals to a plurality of source lines and gate lines, and the source driver and the gate driver are operated at lower operation frequencies. Furthermore, the power supply voltages of the logic circuit portions included in the source driver and the gate driver are lowered. In the case where the frame frequency of the content is lower than the frame frequency that can be displayed by the display device, the source driver and the gate driver included in the
(Continued)

display unit are operated at lower operation frequencies, and power supply voltages of the logic circuit portions included in the source driver and the gate driver are lowered. The image receiving apparatus detects the resolution and the frame frequency of the content.

14 Claims, 16 Drawing Sheets

(51) Int. Cl.
    *G09G 3/3275*     (2016.01)
    *G09G 3/36*     (2006.01)

(52) U.S. Cl.
    CPC ......... *G09G 3/3677* (2013.01); *G09G 3/3688* (2013.01); *G09G 2300/0871* (2013.01); *G09G 2310/0202* (2013.01); *G09G 2310/0286* (2013.01); *G09G 2340/0435* (2013.01)

(56) References Cited

U.S. PATENT DOCUMENTS

| | | |
|---|---|---|
| 2003/0112230 A1 | 6/2003 | Maeda et al. |
| 2004/0008173 A1 | 1/2004 | Maeda et al. |
| 2008/0218500 A1 | 9/2008 | Akai et al. |
| 2010/0053225 A1 | 3/2010 | Furukawa et al. |
| 2012/0001954 A1* | 1/2012 | Yamazaki ............ G09G 3/3607 345/690 |
| 2016/0171938 A1* | 6/2016 | Na ....................... G09G 3/3688 345/698 |
| 2017/0069256 A1* | 3/2017 | Seo ...................... G09G 3/3648 |
| 2017/0236466 A1* | 8/2017 | Spitzer ................ G09G 3/3275 345/560 |
| 2017/0358268 A1* | 12/2017 | Nishio ................. G09G 3/3696 |

FOREIGN PATENT DOCUMENTS

| | | |
|---|---|---|
| EP | 2116992 A | 11/2009 |
| JP | 60-012581 A | 1/1985 |
| JP | 63-060195A U | 4/1988 |
| JP | 07-230077 A | 8/1995 |
| JP | 09-204160 A | 8/1997 |
| JP | 2003-228349 A | 8/2003 |
| KR | 2003-0044809 A | 6/2003 |
| KR | 2016-0072857 A | 6/2016 |
| WO | WO-2008/096481 | 8/2008 |
| WO | WO-2017/142613 | 8/2017 |

OTHER PUBLICATIONS

Written Opinion (Application No. PCT/IB2018/052612) dated Jul. 17, 2018.
Kawashima.S et al., "13.3-in. 8K x 4K 664-ppi OLED Display Using CAAC-OS FETs", SID Digest '14 : SID International Symposium Digest of Technical Papers, Jun. 3, 2014, pp. 627-630.

* cited by examiner

DISPLAY UNIT, DISPLAY DEVICE, AND ELECTRONIC DEVICE

CROSS REFERENCE TO RELATED APPLICATIONS

This application is a U.S. National Phase Application under 35 U.S.C. § 371 of International Application PCT/IB2018/052612, filed on Apr. 16, 2018, which is incorporated by reference and claims the benefit of a foreign priority application filed in Japan on Apr. 27, 2017, as Application No. 2017-088830.

TECHNICAL FIELD

One embodiment of the present invention relates to a display unit. In particular, one embodiment of the present invention relates to a display unit that can display a content with high resolution and a high frame frequency, a display device and an electronic device including the display unit.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter.

Thus, specific examples of the technical field of one embodiment of the present invention disclosed in this specification and the like include a display unit, a display device, an electronic device, a driving method thereof, and a manufacturing method thereof.

Background Art

In recent years, display devices that can display a content with high resolution, i.e., a large number of pixels have been required. For television devices for home use (TVs and television receivers) as well, it is desired to be able to watch a content with high resolution, and at present, broadcast service for a TV which is called high definition or full-high definition (Full HD and 2K) is a mainstream in Japan; however, broadcast service for a TV which is called ultra high definition (4K resolution, 4K2K, and 4K) having four times as much pixels as full-high definition was started in 2015. Furthermore, an experimental broadcast for a TV which is called super high definition (8K resolution, 8K4K, and 8K) that has four times as many pixels as ultra high definition does was started in 2016, and the practical broadcasting is planned in 2018.

Here, a display device which is referred to as full-high definition typically includes 1920×1080 pixels, a display device which is referred to as ultra high definition typically includes 3840×2160 pixels, and a display device which is referred to as super high definition typically includes 7680×4320 pixels.

In addition, display devices that can display a content with a high frame frequency have been desired. The frame frequency is the number of times of display image rewriting by the display device per second. The frame frequency is increased, whereby flickers are suppressed, and smooth moving image display is achieved. As for super high definition, broadcast service with a frame frequency of not only 60 Hz but 120 Hz is also planned.

Non-Patent Document 1 reports an organic EL display having the number of pixels compatible with super high definition.

PRIOR ART DOCUMENT

Non-Patent Document

[Non-Patent Document 1] S. Kawashima, et al., "13.3-In. 8K×4K 664-ppi OLED Display Using CAAC-OS FETs", SID 2014 DIGEST, pp. 627-630.

SUMMARY OF THE INVENTION

Problems to be Solved by the Invention

In order to watch a television broadcast compatible with super high definition, a display device such as a TV compatible with super high definition is needed. However, in a period before wide spread of a display device compatible with super high definition, a conventional high definition or full-high definition broadcasting and a conventional ultra high definition broadcasting can be expected to be continued. Contents can also be delivered by, for example, the media, the Internet, or a cable TV in addition to a television broadcast: however, it can be predicted that at least full-high definition, ultra high definition, and super high definition coexist for some time.

Accordingly, even a display device compatible with super high definition needs to be compatible with the resolution of ultra high definition or full-high definition and needs to be compatible with the frame frequency of not only 120 Hz but 60 Hz or 30 Hz.

In order that a display device displays a content with a resolution lower than the maximum displayable resolution or displays a content with a frame frequency lower than the maximum displayable frame frequency, there is a method for compensating for a lack of image data (also referred to as upconversion) in an image receiving apparatus included in the display device. As a method for interpolating image data, there are a variety of methods such as a method for copying image data for one pixel to four pixels or 16 pixels; a method for referring to surrounding image data and complementing image data with an intermediate color; a method for detecting an edge (outline) from a displayed image and estimating a lack of image data; a method for complementing for image data in the position of a lack of image data from a previous or next frame; and a method for detecting an edge and complementing a similar texture. The same applies to a method for complementing a frame.

However, there has been a problem in that even when the resolution or the frame frequency of a displayed content is low, a display device consumes power corresponding to the maximum resolution and the maximum frame frequency that the display device can deal with, and thus power consumption of the display device is high for the displayed content.

An object of one embodiment of the present invention is to provide a novel display device with low power consumption. Another object of one embodiment of the present invention is to provide a display device in which an operation method can be optimized in accordance with the resolution and the frame frequency of a displayed content to reduce power consumption.

Note that one embodiment of the present invention does not necessarily achieve all the objects listed above and only needs to achieve at least one of the objects. The description of the above objects does not preclude the existence of other objects. Objects other than these will be apparent from the description of the specification, the claims, the drawings, and the like, and objects other than these can be derived from the description of the specification, the claims, the drawings, and the like.

Means for Solving the Problems

One embodiment of the present invention is a display unit including a pixel array, a source driver, and a gate driver. The pixel array includes m×n pixels (m and n are each an integer greater than or equal to 2), m source lines, and n gate lines; the source driver includes a first logic circuit portion and a first selector group; and the gate driver includes a second logic circuit portion and a second selector group. The source driver has a function of outputting a signal to the m source lines, and the gate driver has a function of outputting a signal to the n gate lines. Image data having the amount of information for i×j pixels (i and j are each an integer greater than or equal to 2) is input to the display unit. In the case where i<m, the first selector group outputs one of signals output from the first logic circuit portion, to a plurality of the source lines, and in the case where j<n, the second selector group outputs one of signals output from the second logic circuit portion, to a plurality of the gate lines.

In the above embodiment, in the case where i<m, the first logic circuit portion is operated at a lower operating frequency than in the case where i=m, and in the case where j<n, the second logic circuit portion is operated at a lower operating frequency than in the case where j=n.

In the above embodiment, in the case where i<m, the first logic circuit portion is operated at a lower power supply voltage than in the case where i=m, and in the case where j<n, the second logic circuit portion is operated at a lower power supply voltage than in the case where j=n.

In the above embodiment, the source driver includes a first level shifter portion, the gate driver includes a second level shifter portion, the first level shifter portion includes a group of first to kth level shifters (k is an integer greater than or equal to 2), and the second level shifter portion includes a group of (k+1)th to lth level shifters (l is an integer greater than or equal to k+2). In the case where i<m, the first level shifter portion is operated using the group of level shifters different from the case where i=m or the group of level shifters having a different combination from the case where i=m, among the group of the first to kth level shifters. In the case where j<n, the second level shifter portion is operated using the group of level shifters different from the case where j=n or the group of level shifters having a different combination from the case where j=n, among the group of the (k+1)th to lth level shifters.

In the above embodiment, when displayable image data is input to the display unit and the maximum frame frequency of the image data is denoted as f image data having a frame frequency g is input to the display unit, and in the case where g<f the first logic circuit portion and the second logic circuit portion are operated at a lower operating frequency than in the case where g=f.

In the above embodiment, in the case where g<f the first logic circuit portion and the second logic circuit portion are operated at a lower power supply voltage than in the case where g=f.

In the above embodiment, the pixel includes a transistor including a metal oxide in a channel formation region.

Another embodiment of the present invention is a display device including a display unit and an image receiving apparatus. The display unit includes a pixel array, a source driver, and a gate driver; the source driver includes a first logic circuit portion and a first selector group; and the gate driver includes a second logic circuit portion and a second selector group. The pixel array includes m source lines (m is an integer greater than or equal to 2) and n gate lines (n is an integer greater than or equal to 2); the source driver has a function of outputting a signal to the m source lines; and the gate driver has a function of outputting a signal to the n gate lines. The image receiving apparatus has a function of detecting a resolution d of image data. When the display unit is able to display image data with a resolution e at maximum, in the case where image data where d<e is input to the image receiving apparatus, the first selector group outputs, to a plurality of the source lines, one of signals output from the first logic circuit portion, and the second selector group outputs, to a plurality of the gate lines, one of signals output from the second logic circuit portion.

In the above embodiment, in the case where image data where d<e is input to the image receiving apparatus, the first logic circuit portion and the second logic circuit portion are operated at a lower operating frequency than in the case where image data where d=e is input to the image receiving apparatus.

In the above embodiment, in the case image data where d<e is input to the image receiving apparatus, the first logic circuit portion and the second logic circuit portion are operated at a lower power supply voltage than in the case where image data where d=e is input to the image receiving apparatus.

In the above embodiment, the source driver includes a first level shifter portion, the gate driver includes a second level shifter portion, the first level shifter portion includes a group of first to kth level shifters (k is an integer greater than or equal to 2), and the second level shifter portion includes a group of (k+1)th to lth level shifters (l is an integer greater than or equal to k+2). In the case where d<e, the first level shifter portion is operated using the group of level shifters different from the case where d=e or the group of level shifters having a different combination from the case where d=e, among the group of the first to kth level shifters, and the second level shifter portion is operated using the group of level shifters different from the case where d=e or the group of level shifters having a different combination from the case where d=e, among the group of the (k+1)th to lth level shifters.

In the above embodiment, the image receiving apparatus has a function of detecting a frame frequency g of image data, and when the display unit is able to display image data with a frame frequency f at maximum, in the case where image data where g<f is input to the image receiving apparatus, the first logic circuit portion and the second logic circuit portion are operated at a lower operating frequency than in the case where image data where g=f is input to the image receiving apparatus.

In the above embodiment, in the case where image data where g<f is input to the image receiving apparatus, the first logic circuit portion and the second logic circuit portion are operated at a lower power supply voltage than in the case where image data where g=f is input to the image receiving apparatus.

In the above embodiment, the pixel array includes a transistor including a metal oxide in a channel formation region.

Effect of the Invention

The display device includes a display unit, and in the case where the resolution of a content is lower than the resolution that can be displayed by the display device, the source driver and the gate driver included in the display unit output signals to a plurality of the source lines and gate lines, and the source driver and the gate driver are operated at lower operation frequencies. Furthermore, the power supply voltages of the logic circuit portions included in the source driver and the gate driver are lowered. The operation frequencies are reduced and the power supply voltages of the logic circuit portions are lowered, whereby power consumption of the display device can be reduced.

In the case where the frame frequency of a content is lower than the frame frequency that can be displayed by the display device, the source driver and the gate driver included in the display unit are operated at lower operation frequencies, and the power supply voltages of the logic circuit portions included in the source driver and the gate driver are lowered. The operation frequencies are reduced and the power supply voltages of the logic circuit portions are lowered, whereby power consumption of the display device can be reduced.

According to one embodiment of the present invention, a novel display device with low power consumption can be provided. According to another embodiment of the present invention, a display device whose power consumption can be reduced by lowering the operation frequencies of a source driver and a gate driver and lowering the power supply voltages of a logic circuit portions included in the source driver and the gate driver in accordance with the resolution and the frame frequency of a content can be provided.

Note that the effects of one embodiment of the present invention are not limited to the effects listed above. The effects described above do not preclude the existence of other effects. The other effects are effects that are not described in this section and will be described in the following description. The effects that are not described in this section will be derived from the description of the specification, the drawings, or the like and can be extracted from the description as appropriate by those skilled in the art. Note that one embodiment of the present invention has at least one of the above effects and the other effects. Accordingly, one embodiment of the present invention does not have the above effects in some cases.

BRIEF DESCRIPTION OF DRAWINGS

FIGS. 8A and 8B Top views illustrating structure examples of a display unit.

MODE FOR CARRYING OUT THE INVENTION

Figure 1:
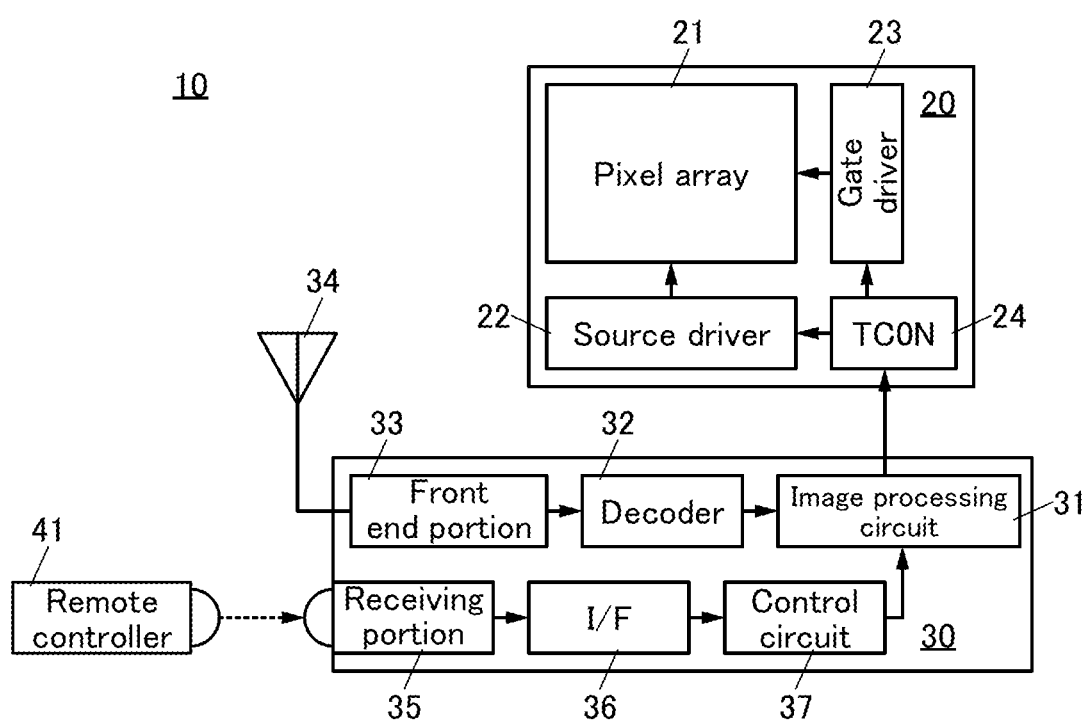
FIG. 1 A block diagram illustrating a structure example of a display device.

Hereinafter, embodiments will be described with reference to drawings. However, the embodiments can be implemented with many different modes. It will be readily appreciated by those skilled in the art that modes and details thereof can be changed in various ways without departing from the spirit and scope thereof. Thus, the present invention should not be interpreted as being limited to the following description of the embodiments. A plurality of embodiments described below can be combined as appropriate.

Note that although the display devices described in the embodiments are explained using a television device or a monitor device each including a display unit and an image receiving apparatus as examples, the display unit of one embodiment of the present invention can be applied to a wide variety of electronic devices including display portions, e.g., a portable information terminal such as a smartphone or a tablet terminal, a digital camera, a video camera, and a navigation system.

In the drawings and the like, the size, the layer thickness, the region, or the like is exaggerated for clarity in some cases. Therefore, they are not necessarily limited to the illustrated scale. The drawings schematically show ideal examples, and shapes, values, or the like are not limited to shapes, values, or the like shown in the drawings.

In the drawings and the like, the same elements, elements having similar functions, elements formed of the same material, elements formed at the same time, or the like are sometimes denoted by the same reference numerals, and description thereof is not repeated in some cases.

In this specification and the like, the term "film" and the term "layer" can be interchanged with each other. For example, the term "conductive layer" can be changed into the term "conductive film" in some cases. Alternatively, for example, the term "insulating film" can be changed into the term "insulating layer" in some cases.

In this specification and the like, the terms for describing arrangement such as "over" and "below" do not necessarily mean directly over and directly below, respectively, in the positional relationship between components. For example, the expression "a gate electrode over a gate insulating layer" does not exclude the case where there is an additional component between the gate insulating layer and the gate electrode.

In this specification and the like, "parallel" refers to a state where two straight lines are arranged such that the angle formed therebetween is greater than or equal to −10° and less than or equal to 10°. Accordingly, the case where the angle is greater than or equal to −5° and less than or equal to 5° is also included. Moreover, "perpendicular" refers to a state where two straight lines are arranged such that the angle formed therebetween is greater than or equal to 80° and less than or equal to 100°. Accordingly, the case where the angle is greater than or equal to 85° and less than or equal to 95° is also included.

Note that ordinal numbers such as "first", "second", and "third" used in this specification and the like are used in order to avoid confusion among components, and the terms do not limit the components numerically.

Furthermore, in this specification and the like, "electrically connected" includes the case where connection is made through an "object having any electric function". Here, there is no particular limitation on the "object having any electric function" as long as electric signals can be transmitted and received between the connected components. Examples of an "object having any electric function" include a switching element such as a transistor, a resistor, an inductor, a capacitor, and other elements with a variety of functions as well as an electrode and a wiring.

In this specification and the like, "voltage" often refers to a potential difference between a given potential and a reference potential (e.g., a ground potential). Thus, a voltage and a potential difference can be interchanged with each other.

In this specification and the like, a transistor is an element having at least three terminals including a gate, a drain, and a source. The transistor includes a channel region between the drain (a drain terminal, a drain region, or a drain electrode) and the source (a source terminal, a source region, or a source electrode), and current can flow between the source and the drain through the channel region. Note that in this specification and the like, a channel region refers to a region through which current mainly flows.

Furthermore, functions of a source and a drain might be switched when a transistor of opposite polarity is employed or the direction of current flow is changed in circuit operation, for example. Therefore, the terms source and drain can be used interchangeably in this specification and the like.

Furthermore, unless otherwise specified, off-state current in this specification and the like refers to a drain current of a transistor in an off state (also referred to as a non-conducting state or a cutoff state). Unless otherwise specified, the off state of an n-channel transistor refers to a state where the voltage Vgs of a gate with respect to a source is lower than the threshold voltage Vth, and the off state of a p-channel transistor refers to a state where the voltage Vgs of a gate with respect to a source is higher than the threshold voltage Vth. That is, the off-state current of an n-channel transistor sometimes refers to a drain current at the time when the voltage Vgs of a gate with respect to a source is lower than the threshold voltage Vth.

In the above description of off-state current, a drain may be replaced with a source. That is, the off-state current sometimes refers to a source current when the transistor is in an off state.

In this specification and the like, leakage current sometimes expresses the same meaning as off-state current. In this specification and the like, the off-state current sometimes refers to a current that flows between a source and a drain when a transistor is in the off state.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, when a metal oxide is used in an active layer of a transistor, the metal oxide is called an oxide semiconductor in some cases. That is to say, in the case where a metal oxide has at least one of an amplifying function, a rectifying function, and a switching function, the metal oxide can be called a metal oxide semiconductor, or OS for short. An OS transistor or an OS FET can be referred to as a transistor including a metal oxide or an oxide semiconductor.

Embodiment 1

In this embodiment, a structure example, an operation method, and the like of a display device that receives a content and displays an image, such as a television device or a monitor device, are described. Note that a content is input as a broadcast signal of a television broadcast or the like or a signal of image data or the like.

<Display Device>

FIG. 1 is a block diagram illustrating a structure example of a display device.

Note that in the drawings attached to this specification, the block diagram in which components are classified according to their functions and shown as independent blocks is illustrated; however, it is difficult to separate completely actual components according to their functions, and it is possible for one component to relate to a plurality of functions.

A display device 10 illustrated in FIG. 1 includes a display unit 20 and an image receiving apparatus 30. The display unit 20 has a function of being supplied with image data, a timing signal, and the like from the image receiving apparatus 30 and displaying an image. The image receiving apparatus 30 has a function of receiving a broadcast signal or image data, a function of generating image data from the broadcast signal, a function of detecting the resolution and the frame frequency of the image data, and the like.

The display unit 20 includes a pixel array 21, a source driver 22, a gate driver 23, and a timing controller (denoted as "TCON" in FIG. 1) 24.

The pixel array 21 includes a plurality of pixels 51, a plurality of source lines, and a plurality of gate lines (see FIG. 2), and each of the pixels 51 is an active element driven by a transistor. The pixel array 21 forms a display portion of the display device 10 and has a function of displaying an image. A more specific structure example of the pixel 51 is described in Embodiment 2 and Embodiment 3.

The source driver 22 has a function of driving the source line and supplies a data signal of image data to the pixel 51 through the source line. The gate driver 23 has a function of driving the gate line and selects the pixel 51. The timing controller 24 supplies image data and a timing signal to the source driver 22 and supplies a timing signal to the gate driver 23. In the case where a backlight is included in the display portion, the timing controller 24 may have a function of outputting a signal or the like for driving the backlight.

The image receiving apparatus 30 includes an image processing circuit 31, a decoder 32, a front end portion 33, an input portion 34, an interface (denoted as "I/F" in FIG. 1) 36, a control circuit 37, a remote controller 41, and a receiving portion 35.

The front end portion 33 has a function of receiving a signal input from the input portion 34 and performing signal processing as appropriate. As examples of the signal input from the input portion 34, a broadcast signal of television broadcast or the like, image data supplied via the media, the Internet, a cable TV, or the like, image data input in a form of an output or the like of a PC (Personal Computer), and the like can be given.

For example, in the case where a broadcast signal encoded by a predetermined method and modulated is input to the front end portion 33, the front end portion 33 and the decoder 32 generate image data from the broadcast signal. In the case where a broadcast signal is input to the front end portion 33, the front end portion 33 has a function of demodulating the input broadcast signal. The front end portion 33 may have a function of performing analog-digital conversion, a function of correcting an error, or the like.

A signal received and processed by the front end portion 33 is output to the decoder 32. The decoder 32 has a function of decoding the encoded signal. In the case where the signal received by the front end portion 33 is compressed, the signal is decompressed by the decoder 32. For example, the decoder 32 may have a function of performing entropy decoding, inverse quantization, inverse orthogonal transform such as inverse discrete cosine transform (IDCT) or inverse discrete sine transform (IDST), intra-frame prediction, inter-frame prediction, and the like.

Note that in the super high definition broadcast, a coding standard called H.265/MPEG-H High Efficiency Video Coding (hereinafter referred to as HEVC) is employed. In the case where the signal input to the decoder 32 is encoded in accordance with HEVC, the decoder 32 decodes the signal in accordance with HEVC.

Image data is generated by decoding processing by the decoder 32 and output to the image processing circuit 31. The image processing circuit 31 has a function of processing the input image data, a function of detecting the resolution and the frame frequency of the input image data, a function of generating a control signal output to the timing controller 24 in accordance with a value of the resolution and a value of the frame frequency, and the like.

The image processing circuit 31 outputs the processed image data and the generated control signal to the timing controller 24. Alternatively, the image processing circuit 31 can output the processed image data to the source driver 22.

The image processing circuit 31 has a function as a processor that can perform arithmetic processing, and can include, for example, an arithmetic circuit, a control circuit, a memory circuit, a variety of interfaces, and the like.

As the image processing circuit 31, for example, a processor such as a CPU (Central Processing Unit), a DSP (Digital Signal Processor), or a GPU (Graphics Processing Unit) can be used. Furthermore, a structure in which the above processor is obtained with a PLD (Programmable Logic Device) such as an FPGA (Field Programmable Gate Array) or an FPAA (Field Programmable Analog Array) may be employed.

The processor interprets and executes instructions from various programs to process various kinds of data and control programs. The programs executed by the processor may be stored in a memory region included in the processor or may be stored in a memory device which is separately provided.

As examples of the function of image data processing performed by the image processing circuit 31, for example, noise removal processing, grayscale conversion processing, tone correction processing, luminance correction processing, and the like can be given. As the correction processing, gamma correction can be given, for example. As an example of the noise removal processing, processing for various noise such as mosquito noise which appears near an outline of texts and the like, block noise which appears in high-speed moving images, and random noise which causes flicker can be given.

The grayscale conversion processing is processing of converting the grayscale of image data into a grayscale corresponding to the output characteristics of the pixel array 21. For example, in the case where the number of grayscale levels is increased, grayscale levels of pixels are interpolated to input image data with a small number of gray levels and assigned to the pixels, so that a histogram can be smoothed. In addition, high dynamic range (HDR) processing for displaying a wide dynamic range is also included in the grayscale conversion processing.

The tone correction processing is processing of correcting the tone of a displayed image, and the luminance correction processing is processing in which the brightness (luminance) is corrected. These correction processing may be performed on the image data, and in the case where a backlight is included in the display portion, these correction processing may be performed on the backlight. For example, a function of measuring the brightness or the tone of a space where the display device 10 is provided is added to the display device 10, so that the brightness or the tone of an image displayed on the pixel array 21 can be corrected. Alternatively, the display device 10 may have a function of comparing an image to be displayed to images of various scenes stored in advance and correcting the luminance and tone of the displayed image to be suitable to the images of the closest scene.

Furthermore, a neural network may be used for processing of image data. For example, a feature included in the image data is extracted using the neural network, and the image processing circuit 31 can select an optimal correction method and can select a parameter used for correction in accordance with the extracted feature. Alternatively, the neural network itself may have a function of performing image data processing.

The image processing circuit 31 may include another processing circuit such as an RGB-RGBW conversion circuit depending on the specifications of the display unit 20. The RGB-RGBW conversion circuit is a circuit that converts image data of RGB (red, green, and blue) into image data of RGBW (red, green, blue, and white). That is, in the case where the pixel array 21 includes pixels of four colors of RGBW, power consumption can be reduced by displaying a W (white) component in the image data with the use of the W (white) pixel. Note that in the case where the display unit 20 includes pixels of four colors of RGBY, an RGB-RGBY (red, green, blue, and yellow) conversion circuit can be used, for example.

FIG. 1 illustrates an example in which the image receiving apparatus 30 includes the receiving portion 35 to which a control signal, data, and the like are transmitted by the remote controller 41. The remote controller 41 may be a portable information terminal or the like.

The interface 36 has a function of performing signal processing appropriately on a control signal input with an operation button provided in the display device 10, a control signal or data received by the receiving portion 35, or the like to output it to the control circuit 37. For the input to the interface 36, in addition to the operation button, an input device such as a pointing device, a keyboard, a mouse, a keypad, a touch panel, an audio input device, or an eye-gaze input device may be used.

The control circuit 37 has a function of supplying a control signal or the like to each of the circuits included in the image receiving apparatus 30. For example, the control circuit 37 has a function of supplying a control signal or the like to the decoder 32 and the image processing circuit 31 on the basis of a signal input from the receiving portion 35 and the interface 36.

<Display Unit>

Figure 2:
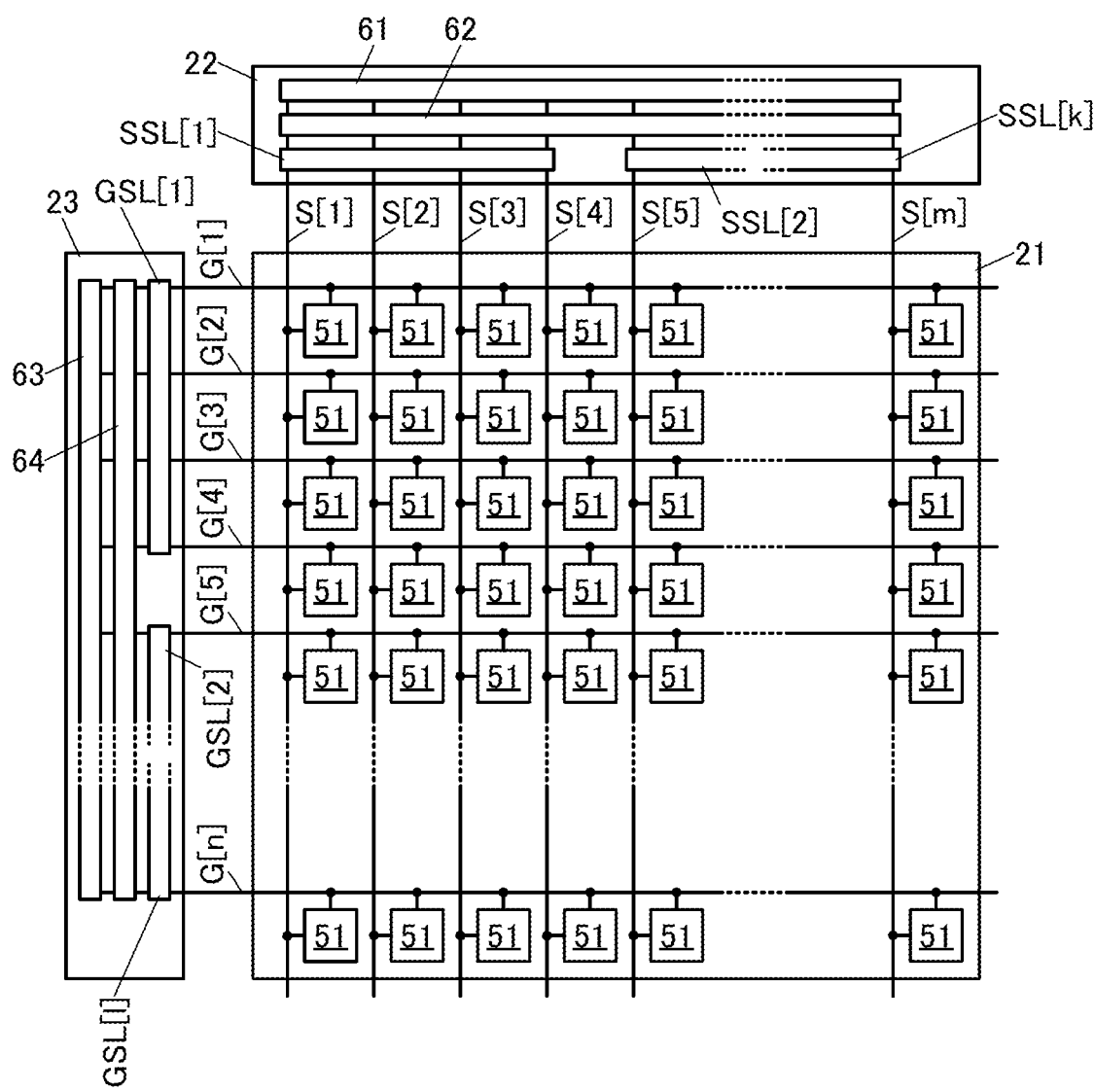
FIG. 2 A block diagram illustrating a structure example of a display unit.

FIG. 2 is a block diagram illustrating a structure example of a display unit. FIG. 2 illustrates the pixel array 21, the source driver 22, and the gate driver 23 included in the display unit 20.

The pixel array 21 includes the plurality of pixels 51. Each of the pixels 51 is electrically connected to any of source lines S[1] to S[m], and each of the pixels 51 is electrically connected to any of gate lines G[1] to G[n]. Each of m and n is an integer greater than or equal to 2, and the pixel array 21 includes m×n pixels 51. In FIG. 2, a constant potential line and the like for forming a power source line or a capacitor are omitted.

When j is an integer greater than or equal to 1 and less than or equal to n, the gate driver 23 has a function of driving the gate line G[j] and selecting the pixels 51 electrically connected to the gate line G[j]. The source driver 22 has a function of supplying a data signal of image data to the source lines S[1] to S[m]. The pixels 51 electrically connected to the gate line G[j] and selected by the gate driver 23 receive data signals supplied to the source lines S[1] to S[m] and express the brightness and color corresponding to the data signals. By repeating this operation from the gate lines G(1) to GL(n), the display unit 20 can display an image on the pixel array 21.

Note that the data signal of the image data is image data corresponding to the pixel 51 selected by the gate driver 23, and is a signal whose potential or the like is adjusted in accordance with the characteristics of display element included in the pixel 51. As examples of the display element included in the pixel 51, a display element that emits light by itself, a display element that changes the proportion of light transmission, a display element that changes the proportion of light reflection, and the like can be given, and a method for expressing the brightness and color varies depending on the display element included in the pixel 51.

Examples of the display element that can be used for the pixel 51 include a transmissive liquid crystal element and a reflective liquid crystal element, and in addition, a light-emitting display element such as an organic EL (Electro Luminescent) element, a QLED (Quantum-dot Light Emitting Diode), an LED (Light Emitting Diode), or a semiconductor laser can be given. Furthermore, a transflective liquid crystal element, a MEMS (Micro Electro Mechanical Systems) shutter element, an optical interference type MEMS element, a display element using a microcapsule method, an electrophoretic method, an electrowetting method, or an Electronic Liquid Powder (registered trademark) method, or the like can be given.

The source driver 22 includes a selector group including selectors SSL[1] to SSL[k]. FIG. 2 illustrates a diagram in which four source lines are electrically connected to the selector SSL[1], and as in the case of the selector SSL[1], four source lines are electrically connected to each of the selectors SSL[2] to SSL[k] as well. Here, k is an integer greater than or equal to 1 and less than or equal to m/4+1.

The gate driver 23 includes a selector group including selectors GSL[1] to GSL[l]. FIG. 2 illustrates a diagram in which four gate lines are electrically connected to the selector GSL[1], and as in the case of the selector GSL[1], four gate lines are electrically connected to each of the selectors GSL[2] to GSL[l] as well. Here, l is an integer greater than or equal to 1 and less than or equal to n/4+1.

The source driver 22 includes a logic circuit portion 61 and an output adjustment portion 62, and the gate driver 23 includes a logic circuit portion 63 and an output adjustment portion 64. The logic circuit portion 61 generates, from image data input from the timing controller 24 or the image processing circuit 31, a signal from which a data signal to be supplied to the source lines S[1] to S[m] is derived. The output adjustment portion 62 adjusts a potential of a signal generated by the logic circuit portion 61, and the like and supplies the capability to drive the source lines S[1] to S[m].

The logic circuit portion 63 determines, in accordance with the timing signal supplied from the timing controller 24, the pixel 51 to be selected, and generates a signal corresponding to the gate line G[j] to be driven. The output adjustment portion 64 adjusts the potential of a signal generated by the logic circuit portion 63, or the like and supplies the capability to drive the gate lines G[1] to G[n]. For the logic circuit portion 63, a shift register is used as a circuit for selecting the gate lines G[1] to G[n] sequentially, for example.

Note that although the selectors SSL[1] to SSL[k] are electrically connected to the source lines in FIG. 2 and FIG. 3, the selectors SSL[1] to SSL[k] may be provided between the logic circuit portion 61 and the output adjustment portion 62. Signals output from the logic circuit portion 61 can be input to the output adjustment portion 62 through the selectors SSL[1] to SSL[k], and the output adjustment portion 62 can adjust and output potentials and the like to the source lines S[1] to S[m]. Similarly, the selectors GSL[1] to GSL[l] may be provided between the logic circuit portion 63 and the output adjustment portion 64.

<Selector>

Figure 3A:
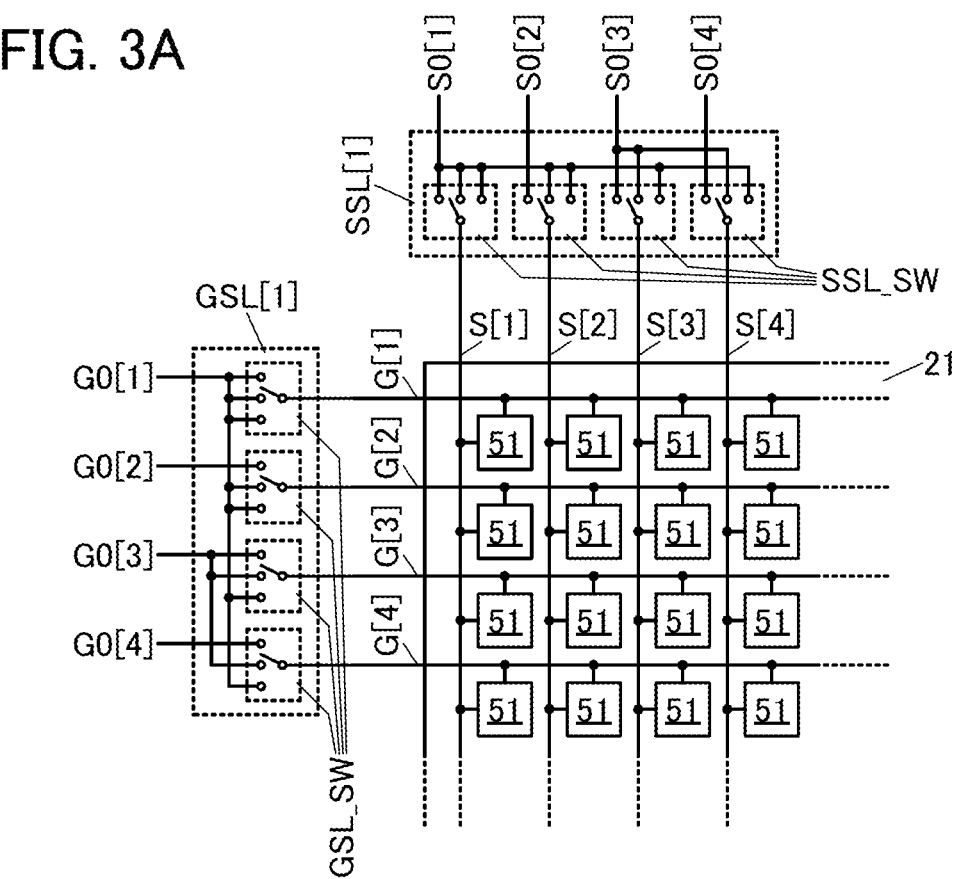
FIG. 3 (A) A circuit diagram illustrating a structure example of a selector, (B) A circuit diagram illustrating a structure example of a switch, (C) A circuit diagram illustrating a structure example of a switch.

FIG. 3(A) is a circuit diagram illustrating a structure example of a selector. FIG. 3(A) illustrates the selector SSL[1] and the selector GSL[1].

Figure 3B:
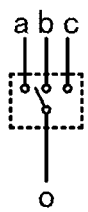

The selector SSL[1] includes four switches SSL_SW, and the switch SSL_SW includes three input portions a to c and one output portion a, as illustrated in FIG. 3(B). Signals S0[1] to S0[4] are input from the output adjustment portion 62 to the selector SSL[1] and are output to the source lines S[1] to S[4]. The selectors SSL[2] to SSL[k] have a structure similar to that of the selector SSL[1] except input signals and source lines to which the signals are output are different.

All the switches SSL_SW are interlock switches. In other words, when a switch SSL_SW selects the input portion a, all the switches SSL_SW select the input portions a. At this time, from the selector SSL[1], the signal S0[1] is output to the source line S[1], the signal S0[2] is output to the source line S[2], the signal S0[3] is output to the source line S[3], and the signal S0[4] is output to the source line S[4].

When the switch SSL_SW selects the input portion b, from the selector SSL[1], the signal S0[1] is output to the source line S[1] and the source line S[2], and the signal S0[3] is output to the source line S[3] and the source line S[4]. When the switch SSL_SW selects the input portion c, in the selector SSL[1], the signal S0[1] is output to the source lines S[1] to S[4].

Figure 3C:
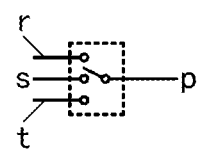

The selector GSL[1] includes four switches GSL_SW, and the switch GSL_SW includes three input portions r to t and one output portionp as illustrated in FIG. 3(C). Signals G0[1] to G0[4] are input from the output adjustment portion 64 to the selector GSL[1] and are output to the gate lines G[1] to G[4]. The selectors GSL[2] to GSL[l] have a structure similar to that of the selector GSL[1] except input signals and gate lines to which the signals are output are different.

All the switches GSL_SW are interlock switches. In other words, when the switch GSL_SW selects the input portion r, all the switches GSL_SW select the input portions r. At this time, from the selector GSL[1], the signal G0[1] is output to the gate line G[1], the signal G0[2] is output to the gate line G[2], the signal G0[3] is output to the gate line G[3], and the signal G0[4] is output to the gate line G[4].

When the switch GSL_SW selects the input portions, from the selector GSL[1], the signal G0[1] is output to the gate line G[1] and the gate line G[2], and the signal G0[3] is output to the gate line G[3] and the gate line G[4]. When the switch GSL_SW selects the input portion t, in the selector GSL[1], the signal G0[1] is output to the gate lines G[1] to G[4].

As described above, the selector SSL[1] to SSL[k] have a function of transmitting signals input from the output adjustment portion 62 to the source lines S[1] to S[m] as they are, a function of transmitting one signal input from the output adjustment portion 62 to two source lines, and a function of transmitting one signal input from the output adjustment portion 62 to four source lines. The selectors GSL[1] to GSL[l] have a function of transmitting signals input from the output adjustment portion 64 to the gate lines G[1] to G[n] as they are, a function of transmitting one signal input from the output adjustment portion 64 to two gate lines, and a function of transmitting one signal input from the output adjustment portion 64 to four gate lines.

<Logic Circuit Portion>

Figure 4A:
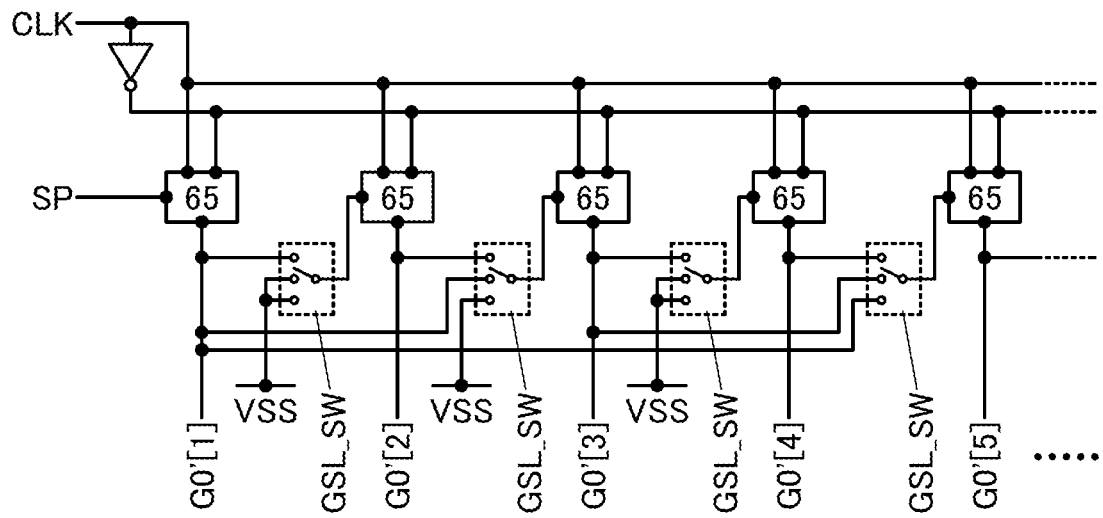
FIG. 4 (A) A circuit diagram illustrating a structure example of a logic circuit portion, (B) A diagram illustrating a symbol of a shift register, (C) A circuit diagram illustrating a structure example of a shift register.

Note that in the case where a shift register is used for the logic circuit portion 63 as a circuit for sequentially selecting the gate lines G[1] to G[n], the switch GSL_SW is also necessary in the logic circuit portion 63. FIG. 4(A) is a circuit diagram illustrating the structure example of the logic circuit portion 63.

FIG. 4(A) illustrates first five shift registers 65 among the shift registers included in the logic circuit portion 63, four of the switches GSL_SW included in the logic circuit portion 63, and an inverter that inverts a logic of a clock signal CLK. The clock signal CLK and a start pulse SP are input to the logic circuit portion 63 illustrated in FIG. 4(A), and signals G0'[1] to G0'[5] from which the signals G0[1] to G0[5] are derived are output to the output adjustment portion 64. Note that although some of the input portions included in the switches GSL_SW are electrically connected to the low potential power supply VSS of the logic circuit portion 63, a power supply line and the like other than this are omitted.

Figure 4B:
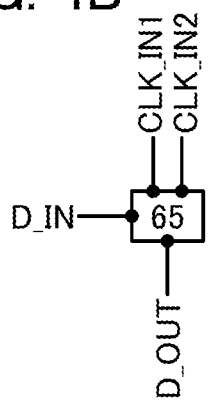

FIG. 4(B) is a diagram illustrating a symbol of the shift register 65 and illustrates a state of the input and output to/from the shift register 65. The shift register 65 includes clock signal input portions CLK_IN1 and CLK_IN2, an input portion D_IN, and an output portion D_OUT.

Figure 4C:
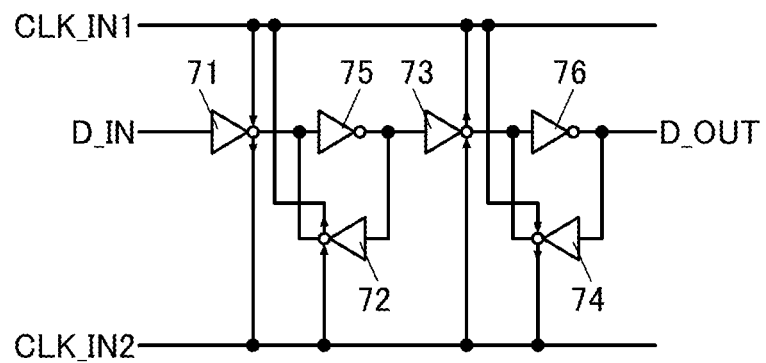

While FIG. 4(B) is a diagram illustrating the symbol of the shift register 65, FIG. 4(C) is a circuit diagram illustrating a structure example of the shift register 65. The shift register 65 includes clocked inverters 71 to 74 and inverters 75 and 76.

Figure 5:
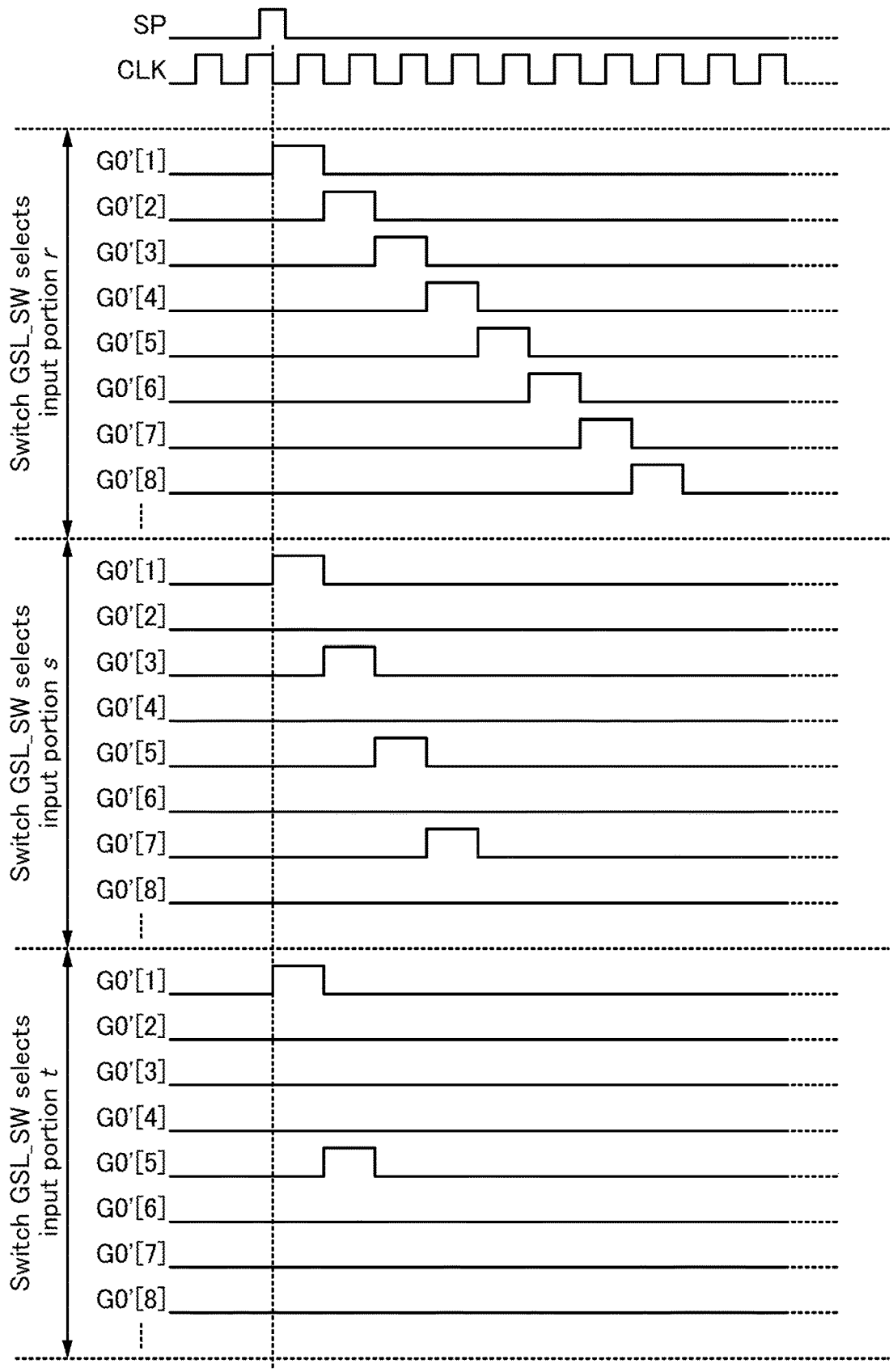
FIG. 5 A timing chart of a logic circuit portion.

Note that all the switches GSL_SW included in the logic circuit portion 63 are in conjunction with the switches GSL_SW included in the selectors GSL[1] to GSL[l]. FIG. 5 shows a timing chart of the logic circuit portion 63.

The timing chart shown in FIG. 5 shows the relation between the clock signal CLK and the start pulse SP which are input to the logic circuit portion 63 and G0'[1] to G0'[8] of the signals output from the logic circuit portion 63. Furthermore, as for the signals G0'[1] to G0'[8] output from the logic circuit portion 63, three states are shown: a state in which the switch GSL_SW selects the input portion r, a state in which the switch GSL_SW selects the input portion s, and a state in which the switch GSL_SW selects the input portion t.

In the state where the switch GSL_SW selects the input portion r, at the timing of a fall of the clock signal CLK when the start pulse SP is High, the signals G0'[1] to G0'[8] are sequentially output as pulse-like signals. When the potentials and the like of the signals G0'[1] to G0'[8] are adjusted by the output adjustment portion 64, the signals can be used as signals for sequentially selecting the gate lines G[1] to G[8].

In the state where the switch GSL_SW selects the input portion s, at the timing of a fall of the clock signal CLK when the start pulse SP is High, the signals G0'[1] to G0'[8] are alternately output as pulse-like signals. That is, the signal G0'[2], the signal G0'[4], the signal G0'[6], and the signal G0'[8] remain Low.

This is because in the state where the switch GSL_SW selects the input portion s, the low potential power supply VSS is input to the input portions D_IN of the shift registers 65 that output the signal G0'[2], the signal G0'[4], the signal G0'[6], and the signal G0'[8] (see FIG. 4(A)). Either the low potential power supply or the high potential power supply is input to the input portions D_IN of the shift registers 65, and it is preferable that the input portions D_IN be not in a floating state but be electrically connected to either the low potential power supply or the high potential power supply. Note that in the case where the high potential power supply is input to the input portions D_IN of the shift registers 65, the signal G0'[2], the signal G0'[4], the signal G0'[6], and the signal G0'[8] become High.

In the state where the switch GSL_SW selects the input portion t, at the timing of a fall of the clock signal CLK when the start pulse SP is High, the signals G0'[1] to G0'[8] are output as pulse-like signals every three signals. That is, the signals G0'[2] to G0'[4] and the signals G0'[6] to G0'[8] remain Low.

This is because in the state where the switch GSL_SW selects the input portion t, the low potential power supply VSS is input to the input portions D_IN of the shift registers 65 that output the signals G0'[2] toG0'[4] and the signals G0'[6] to G0'[8] (see FIG. 4(A)).

Figure 6:
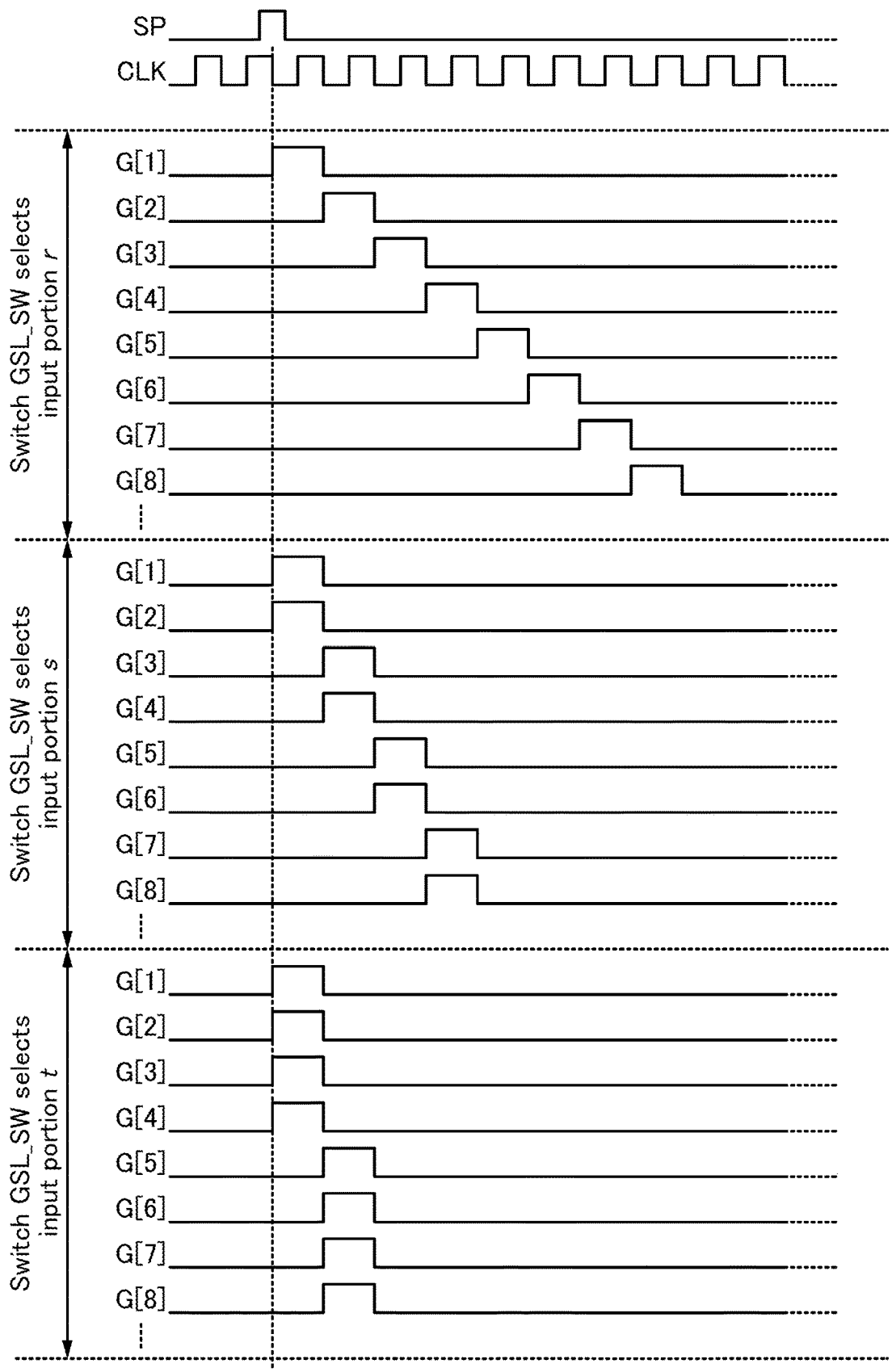
FIG. 6 A timing chart.

Next, the timing chart shown in FIG. 6 shows a state in which the signals G0'[1] toG0'[8] shown in FIG. 5 are output to the gate lines G[1] to G[8] from the gate driver 23 through the output adjustment portion 64 and the selectors GSL[1] and GSL[2]. Note that FIG. 5 and FIG. 6 are timing charts and thus show the timing of becoming Low or High, and the potentials and the like are not shown accurately.

In the state where the switch GSL_SW selects the input portion r, the timing chart of the gate lines G[1] to G[8] is the same as that of the signals G0'[1] toG0'[8].

In the state where the switch GSL_SW selects the input portion s, the same signal as that of the gate line G[1] is output to the gate line G[2], the same signal as that of the gate line G[3] is output to the gate line G[4], the same signal as that of the gate line G[5] is output to the gate line G[6], and the same signal as that of the gate line G[7] is output to the gate line G[8]. This is because the selectors GSL[1] and GSL[2] transmit one signal to two gate lines.

In the state where the switch GSL_SW selects the input portion t, the same signal as that of the gate line G[1] is output to the gate lines G[2] to G[4], and the same signal as that of the gate line G[5] is output to the gate lines G[6] to G[8]. This is because the selectors GSL[1] and GSL[2] transmit one signal to four gate lines.

As described above, the gate driver 23 can output a signal to one gate line (when the switch GSL_SW selects the input portion r), can output a signal to two gate lines at the same time (when the switch GSL_SW selects the input portion s), or can output a signals to four gate lines at the same time (when the switch GSL_SW selects the input portion t). The gate driver 23 can switch an operation method by changing the selection of the switch GSL_SW. The pixels 51 selected by a signal output from the gate driver 23 take data signals supplied to the source lines S[1] to S[m] and express the brightness and color corresponding to the data signals.

Note that when the gate driver 23 outputs a signal to two gate lines at the same time, the time required to select the gate lines G[1] to G[n] is ½ as compared with the case where the gate driver 23 outputs a signal to one gate line. That is, when the frequency of the clock signal CLK is set to ½, the time required to select the gate lines G[1] to G[n] can be the same as that in the case where the gate driver 23 outputs a signal to one gate line. The same applies to the case where the gate driver 23 outputs a signal to four gate lines at the same time.

Figure 7:
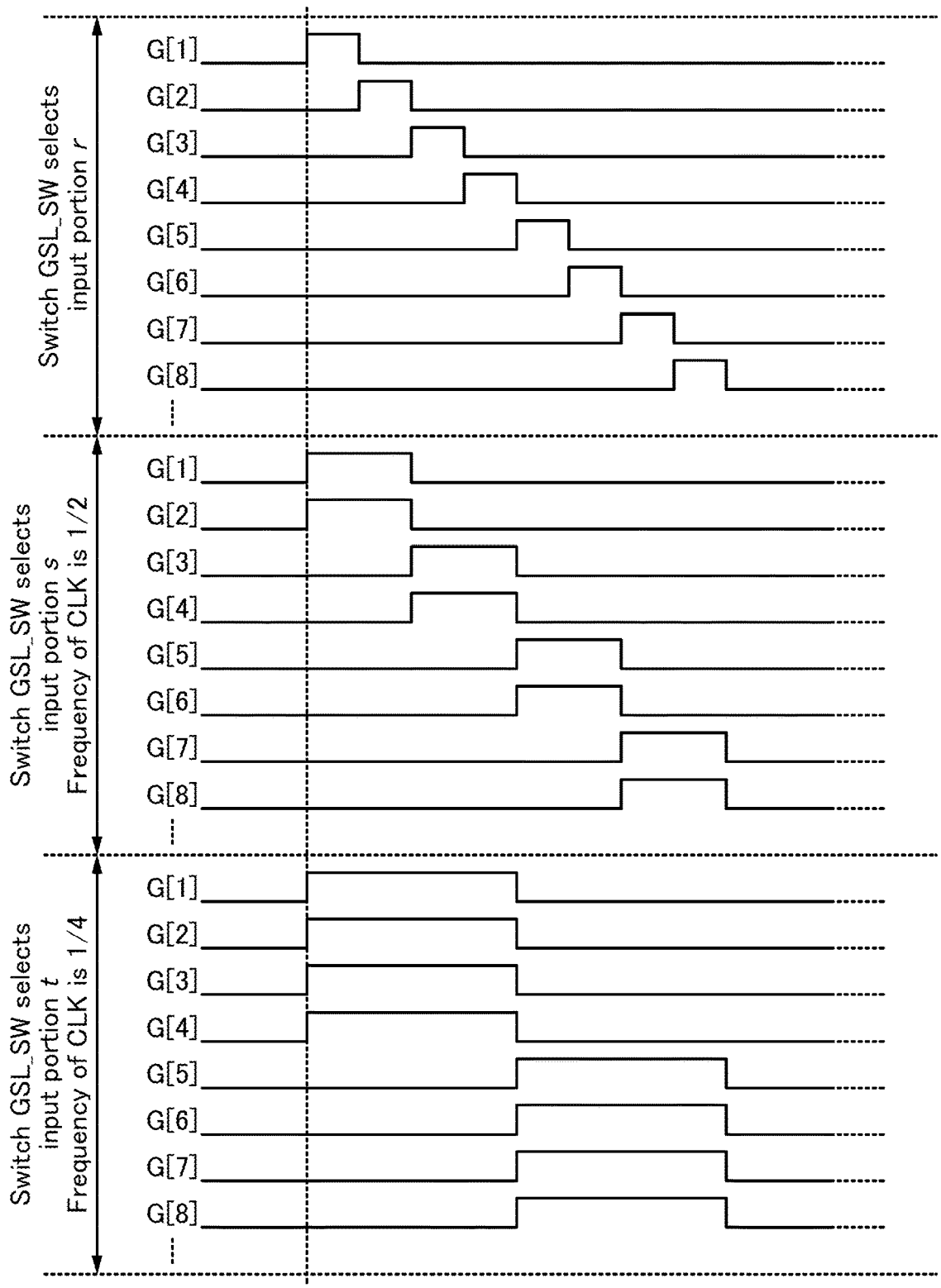
FIG. 7 A timing chart.

FIG. 7 is a timing chart in the case where the frequency of the clock signal CLK is set to ½ when the gate driver 23 outputs a signal to two gate lines at the same time (the case where the switch GSL_SW selects the input portion s) and in the case where the frequency of the clock signal CLK is set to ¼ when the gate driver 23 outputs a signal to four gate lines at the same time (the case where the switch GSL_SW selects the input portion t)

<Operation Method>

For example, the display device 10 is a display device compatible with super high definition, and the pixel array 21 includes 7680×4320 pixels 51 (m=7680 and n=4320). The image processing circuit 31 detects the resolution of input image data, and the operation method is switched as follows.

In the case where a content compatible with the super high definition standards is input to the display device 10, in the selectors SSL[1] to SSL[k] included in the source driver 22, the switches SSL_SW select the input portions a. In the selectors GSL[1] to GSL[l] and the logic circuit portion 63 which are included in the gate driver 23, the switches GSL_SW select the input portions r.

The content compatible with the super high definition standards includes pixel data for 7680×4320 pixels, and in the selectors SSL[1] to SSL[k], the signal S0[1] is output to the source line S[1], the signal S0[2] is output to the source line S[2], the signal S0[3] is output to the source line S[3], and the signal S0[4] is output to the source line S[4] (the same applies hereafter). Furthermore, in the selectors GSL[1] to GSL[l], the signal G0[1] is output to the gate line G[1], the signal G0[2] is output to the gate line G[2], the signal G0[3] is output to the gate line G[3], and the signal G0[4] is output to the gate line G[4] (the same applies hereafter).

In the case where a content compatible with the ultra high definition standards is input to the display device 10, in the selectors SSL[1] to SSL[k] included in the source driver 22, the switches SSL_SW select the input portions b. In the selectors GSL[1] to GSL[l] and the logic circuit portion 63 which are included in the gate driver 23, the switches GSL_SW select the input portions s.

A content compatible with the ultra high definition standards includes pixel data for 3840×2160 pixels, and in the selectors SSL[1] to SSL[k], the signal S0[1] is output to the source line S[1] and the source line S[2], and the signal S0[3] is output to the source line S[3] and the source line S[4] (the same applies hereafter). Furthermore, in the selectors GSL[1] to GSL[l], the signal G0[1] is output to the gate line G[1] and the gate line G[2], and the signal G0[3] is output to the gate line G[3] and the gate line G[4] (the same applies hereafter).

In the logic circuit portion 63 included in the gate driver 23, the frequency of the clock signal CLK is set to ½ as compared with the case where a content compatible with the super high definition standards is input. At this time, also in the logic circuit portion 61 included in the source driver 22, the operating frequency is set to ½ in accordance with the logic circuit portion 63.

The number of signals output to the output adjustment portion 62 at a time by the logic circuit portion 61 is also ½ (3840 against 7680); thus, in the case where a serial-parallel conversion circuit, a shift register, a demultiplexer, or the like is used for the logic circuit portion 61, the operating frequency of the logic circuit portion 61 can be further lowered by ½. In this case, the operating frequency of the logic circuit portion 61 can be set to ¼ as compared with the case where a content compatible with the super high definition standards is input.

In the case where a content compatible with the full high definition standards is input to the display device 10, in the selectors SSL[1] to SSL[k] included in the source driver 22, the switches SSL_SW select the input portions c. In the selectors GSL[1] to GSL[l] and the logic circuit portion 63 which are included in the gate driver 23, the switches GSL_SW select the input portions t.

The content corresponding to the full high definition standards includes pixel data for 1920×1080 pixels, and in the selectors SSL[1] to SSL[k], the signal S0[1] is output to the source lines S[1] to S[4], and the signal S0[5] is output to the source lines S[5] to S[8] (the same applies hereafter). Furthermore, in the selectors GSL[1] to GSL[l], the signal G0[1] is output to the gate lines G[1] to G[4], and the signal G0[5] is output to the gate lines G[5] to G[8] (the same applies hereafter).

In the logic circuit portion 63 included in the gate driver 23, the frequency of the clock signal CLK is set to ¼ as compared with the case where a content compatible with the super high definition standards is input. At this time, also in the logic circuit portion 61 included in the source driver 22, the operating frequency is set to ¼ in accordance with the logic circuit portion 63.

The number of signals output to the output adjustment portion 62 at a time by the logic circuit portion 61 is also ¼ (1920 against 7680); thus, in the case where a serial-parallel conversion circuit, a shift register, a demultiplexer, or the like is used for the logic circuit portion 61, the operating frequency of the logic circuit portion 61 can be further lowered by ¼. In this case, the operating frequency of the logic circuit portion 61 can be set to 1/16 as compared with the case where a content compatible with the super high definition standards is input.

As described above, in the case where a content compatible with the ultra high definition standards or the full high definition standards is input to the display device 10, the logic circuit portion 61 included in the source driver 22 and the logic circuit portion 63 included in the gate driver 23 can be operated at lower operation frequencies. By operation with lower operation frequencies, power consumption of the source driver 22 and the gate driver 23 can be reduced. In the case where the source driver 22 and the gate driver 23 are operated at lower operation frequencies, the power supply voltages of the logic circuit portion 61 included in the source driver 22 and the logic circuit portion 63 included in the gate driver 23 can be lowered.

In general, power consumption of a logic circuit is regarded as the sum of operation current (dynamic current) required for switching between Low and High of the logic and leakage current (static current) that flows even in a state where switching between Low and High of the logic is not performed. The operation current of the former is proportional to the operating frequency and the power supply voltage, and power consumption (dynamic power consumption) due to the operation current is proportional to the operating frequency, and is proportional to the square of the power supply voltage.

In the logic circuit, when the operating frequency of the logic circuit becomes ½, the power supply voltage can be approximately ½. This is because it is estimated that when the power supply voltage of the logic circuit is set to ½, the amount of current that can be supplied by a transistor forming the logic circuit is approximately ¼ when the threshold voltage is negligibly small, and the operation current required for switching between Low and High of the logic becomes ½; therefore, the rest of approximately ½ is an operating frequency. In practice, it is not limited thereto because of the influence of the threshold voltage, a margin added to the power supply voltage, or the like.

Thus, the source driver 22 and the gate driver 23 are operated at lower operation frequencies, whereby power consumption can be reduced. Moreover, the power supply voltages of the logic circuit portion 61 included in the source driver 22 and the logic circuit portion 63 included in the gate driver 23 are lowered, whereby power consumption can be reduced.

This can be also applied to the case where the frame frequency is changed. The display device 10 is, for example, a display device compatible with the frame frequency of 120 Hz. In the case where a content having a frame frequency of 60 Hz is input to the display device 10, the image processing circuit 31 detects the frame frequency of input image data, and the operation method is switched as follows.

In the logic circuit portion 63 included in the gate driver 23, the frequency of the clock signal CLK is set to ½ as compared with the case where a content having the frame frequency of 120 Hz is input. Also in the logic circuit portion 61 included in the source driver 22, the operating frequency is set to ½ in accordance with the logic circuit portion 63. In the case where the resolution of the image data is not changed, switching of the switch SSL_SW and the switch GSL_SW is not necessary.

The logic circuit portion 61 included in the source driver 22 and the logic circuit portion 63 included in the gate driver 23 can be operated at lower operation frequencies. By operation with lower operation frequencies, power consumption of the source driver 22 and the gate driver 23 can be reduced. Moreover, the power supply voltages of the logic circuit portion 61 included in the source driver 22 and the logic circuit portion 63 included in the gate driver 23 can be lowered. The power supply voltages of the logic circuit portion 61 included in the source driver 22 and the logic circuit portion 63 included in the gate driver 23 are lowered, whereby power consumption can be reduced.

Also in the case where a content having a frame frequency of 30 Hz is input to the display device 10, the operation frequencies of the logic circuit portion 61 included in the source driver 22 and the logic circuit portion 63 included in the gate driver 23 are set to ¼, whereby operation can be performed in a manner similar to that of the above.

For example, the display unit 20 can be a display unit compatible with a frame frequency of 240 Hz. The image receiving apparatus 30 has a function of interpolating image data, and contents having frame frequencies of 30 Hz, 60 Hz, and 120 Hz are set to have 60 Hz, 120 Hz, and 240 Hz, whereby the display device 10 can be a display device that excels in displaying a moving image.

<Output Adjustment Portion>

The output adjustment portion 62 included in the source driver 22 and the output adjustment portion 64 included in the gate driver 23 each have a level shifter. The level shifters have a function of adjusting signals output from the logic circuit portion 61 and the logic circuit portion 63 to potentials suitable for the characteristics of a display element included in the pixel 51.

The display device 10 has a function of detecting the resolution and the frame frequency of input image data and lowering the power supply voltages of the logic circuit portion 61 and the logic circuit portion 63. Therefore, potentials of signals output from the logic circuit portion 61 and the logic circuit portion 63 vary depending on the resolution and the frame frequency of the image data. Accordingly, level shift in a wide potential range is required for the level shifters included in the output adjustment portion 62 and the output adjustment portion 64.

Although the level shifters included in the output adjustment portion 62 and the output adjustment portion 64 can have a circuit structure compatible with a wide potential range independently, they can also have a structure of selecting an appropriate level shifter from a plurality of kinds of level shifters or a structure of selecting the number of level shifters connected in series, in accordance with potentials of signals output from the logic circuit portion 61 and the logic circuit portion 63.

As for the level shifter, in the case of the structure of selecting an appropriate level shifter or the structure of selecting the number of level shifters connected in series, the switch SSL_SW and the switch GSL_SW can be used. In the case where the switches SSL_SW are used for the level shifters, a structure in conjunction with the switches SSL_SW included in the selectors SSL[1] to SSL[k] can be employed, and in the case where the switches GSL_SW are used for the level shifters, a structure in conjunction with the switches GSL_SW included in the selectors GSL[1] to GSL[l] and the logic circuit portion 63 can be employed.

In the case of the structure of selecting an appropriate level shifter or the structure of selecting the number of level shifters connected in series, level shift can be efficiently performed in accordance with the characteristics of the level shifter.

This embodiment can be implemented in combination with the other embodiments described in this specification as appropriate.

Embodiment 2

In this embodiment, examples of a display unit that can be used for the display device exemplified in the above embodiment will be described.

<Structure Example>

Figure 8A:
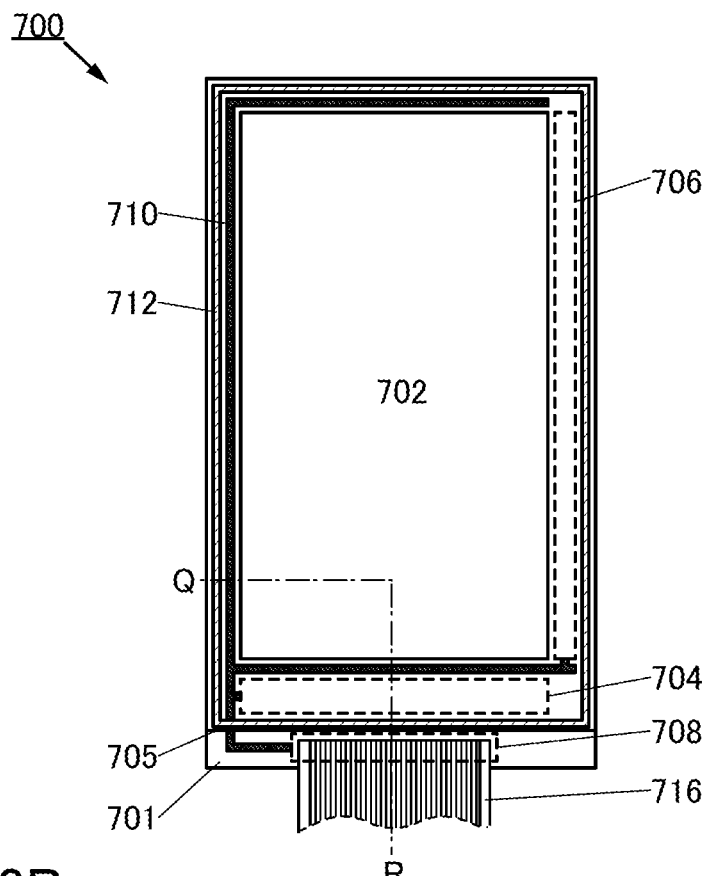

FIG. 8(A) is a top view illustrating an example of a display unit. A display unit 700 illustrated in FIG. 8(A) includes a pixel portion 702 provided over a first substrate 701, a source driver circuit portion 704 and a gate driver circuit portion 706 that are provided over the first substrate 701, a sealant 712 provided to surround the pixel portion 702, the source driver circuit portion 704, and the gate driver circuit portion 706, and a second substrate 705 provided to face the first substrate 701. Note that the first substrate 701 and the second substrate 705 are sealed with the sealant 712. That is, the pixel portion 702, the source driver circuit portion 704, and the gate driver circuit portion 706 are sealed with the first substrate 701, the sealant 712, and the second substrate 705. Although not illustrated in FIG. 8(A), a display element is provided between the first substrate 701 and the second substrate 705.

In the display unit 700, an FPC terminal portion 708 (FPC: Flexible Printed Circuits) electrically connected to each of the pixel portion 702, the source driver circuit portion 704, the gate driver circuit portion 706, and the gate driver circuit portion 706 is provided in a region different from the region which is surrounded by the sealant 712 and positioned over the first substrate 701. An FPC 716 is connected to the FPC terminal portion 708, and a variety of signals and the like are supplied from the FPC 716 to the pixel portion 702, the source driver circuit portion 704, and the gate driver circuit portion 706. A signal line 710 is connected to the pixel portion 702, the source driver circuit portion 704, the gate driver circuit portion 706, and the FPC terminal portion 708. A variety of signals and the like are supplied from the FPC 716 to the pixel portion 702, the source driver circuit portion 704, the gate driver circuit portion 706, and the FPC terminal portion 708 via the signal line 710.

A plurality of gate driver circuit portions 706 may be provided in the display unit 700. In addition, an example of the display unit 700 in which the source driver circuit portion 704 and the gate driver circuit portion 706 are formed over the first substrate 701 where the pixel portion 702 is also formed is described; however, the structure is not limited thereto. For example, only the gate driver circuit portion 706 may be formed over the first substrate 701 or only the source driver circuit portion 704 may be formed over the first substrate 701. In this case, a structure may be employed in which a substrate over which a source driver circuit, a gate driver circuit, or the like is formed (e.g., a driver circuit substrate formed using a single-crystal semiconductor film or a polycrystalline semiconductor film) is formed on the first substrate 701. Note that there is no particular limitation on the method for connecting a separately prepared driver circuit substrate, and a COG (Chip On Glass) method, a wire bonding method, or the like can be used.

Moreover, the display unit 700 can include a variety of elements. Examples of the elements include an electroluminescent (EL) element (an EL element containing an organic matter and an inorganic matter, an organic EL element, an inorganic EL element, an LED, and the like), a light-emitting transistor element (a transistor that emits light depending on current), an electron emitter, a liquid crystal element, an electronic ink element, an electrophoretic element, an electrowetting element, a plasma display panel (PDP), a MEMS (microelectromechanical systems) display (e.g., a grating light valve (GLV), a digital micromirror device (DMD), a digital micro shutter (DMS) element, and an interferometric modulation (IMOD) element), and a piezoelectric ceramic display.

Furthermore, examples of a display unit using an EL element include an EL display. Examples of display units using electron emitters include a field emission display (FED) and an SED-type flat panel display (SED: Surface-conduction Electron-emitter Display). Examples of display units using liquid crystal elements include liquid crystal displays (a transmissive liquid crystal display, a transflective liquid crystal display, a reflective liquid crystal display, a direct-view liquid crystal display, and a projection liquid crystal display). Examples of a display unit using an electronic ink element or an electrophoretic element include electronic paper. Note that in the case where a transflective liquid crystal display or a reflective liquid crystal display is obtained, some or all of pixel electrodes function as reflective electrodes. For example, some or all of pixel electrodes contain aluminum, silver, or the like. Moreover, in such a case, a memory circuit such as an SRAM can be provided under the reflective electrodes. Thus, the power consumption can be further reduced.

Note that as a display method in the display unit 700, a progressive method, an interlace method, or the like can be used. Furthermore, color elements controlled in a pixel at the time of color display are not limited to three colors: R, G, and B (R, G, and B correspond to red, green, and blue, respectively). For example, four pixels of the R pixel, the G pixel, the B pixel, and a W (white) pixel may be employed. Alternatively, a color element may be composed of two colors among R, G, and B as in PenTile layout, and two different colors may be selected depending on color elements. Alternatively, one or more colors of yellow, cyan, magenta, and the like may be added to R, G, and B. Note that the size of a display region may differ between dots of the color elements. Note that the disclosed invention is not limited to a display unit for color display and can also be applied to a display unit for monochrome display.

In addition, a coloring layer (also referred to as a color filter) may be used to make a display unit perform full-color display in which white light (W) is used for a backlight (an organic EL element, an inorganic EL element, an LED, a fluorescent lamp, or the like). For example, for the coloring layer, red (R), green (G), blue (B), and yellow (Y) can be used in combination as appropriate. With the use of the coloring layer, higher color reproducibility can be obtained as compared with the case without the coloring layer. In that case, by providing a region with a coloring layer and a region without a coloring layer, white light in the region without the coloring layer may be directly utilized for display. By partly providing the region without the coloring layer, a decrease in luminance of a bright image due to the coloring layer can be suppressed, and approximately 20% to 30% of power consumption can be reduced in some cases. Note that in the case where full-color display is performed using a self-luminous element such as an organic EL element or an inorganic EL element, elements may emit light of their respective colors R, G, B, Y, and W. By using a self-luminous element, power consumption may be further reduced as compared with the case of using a coloring layer.

Furthermore, as a coloring system, in addition to the above-described system (color filter system) in which part of white light is converted into red light, green light, and blue light through color filters, a system (three-color system) in which red light, green light, and blue light are used or a system (color conversion system or quantum dot system) in which part of blue light is converted into red or green may be used.

Figure 8B:
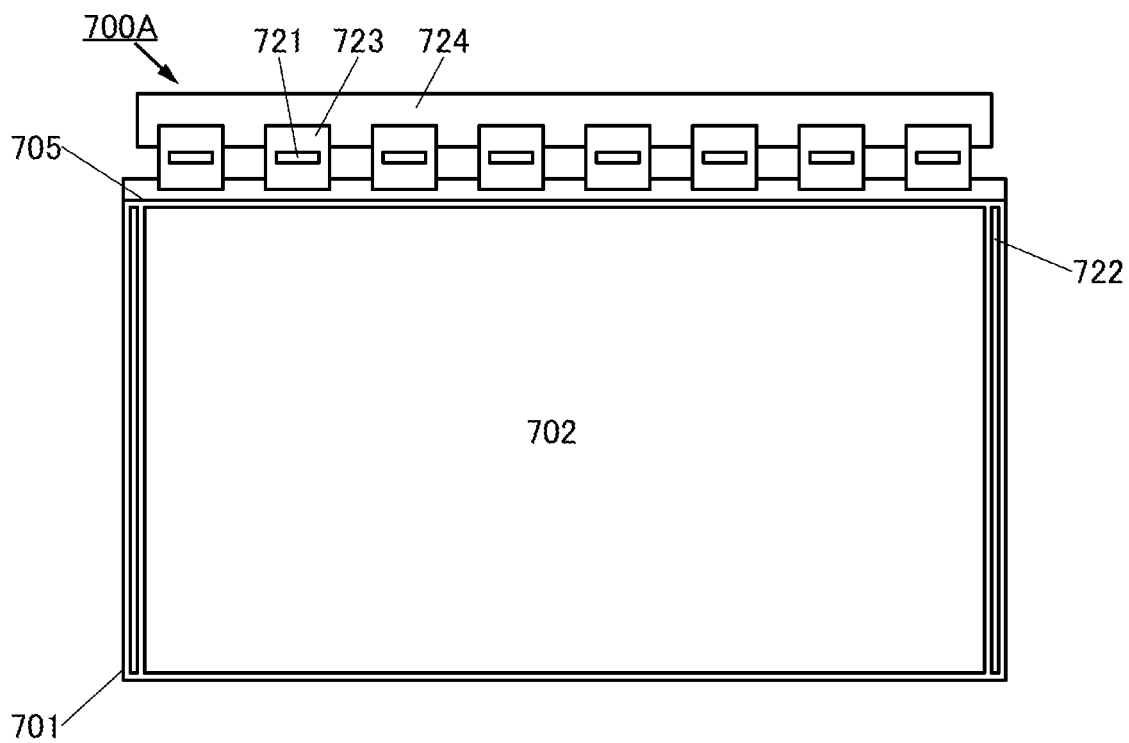

A display unit 700A illustrated in FIG. 8(B) is a display unit that can be favorably used for an electronic device with a large screen. For example, the display device 700A can be favorably used for a television device, a monitor device, digital signage, or the like.

The display unit 700A includes a plurality of source driver ICs 721 and a pair of gate driver circuits 722.

The plurality of source driver ICs 721 are attached to respective FPCs 723. In each of the plurality of FPCs 723, one of terminals is connected to the substrate 701, and the other terminal is connected to a printed circuit board 724. The printed circuit board 724 can be mounted on the electronic device in such a manner that the FPCs 723 are bent so that the printed circuit board 724 is located on the back side of the pixel portion 702.

On the other hand, the gate driver circuits 722 are provided over the substrate 701. Thus, an electronic device with a narrow frame can be obtained.

With such a structure, a large-size and high-resolution display unit can be obtained. For example, such a structure can be used for a display unit whose screen diagonal is 30 inches or more, 40 inches or more, 50 inches or more, or 60 inches or more. Moreover, a display unit having extremely high resolution such as full high definition, ultra high definition, or super high definition can be obtained.

<Cross-Sectional Structure Example>

Figure 9:
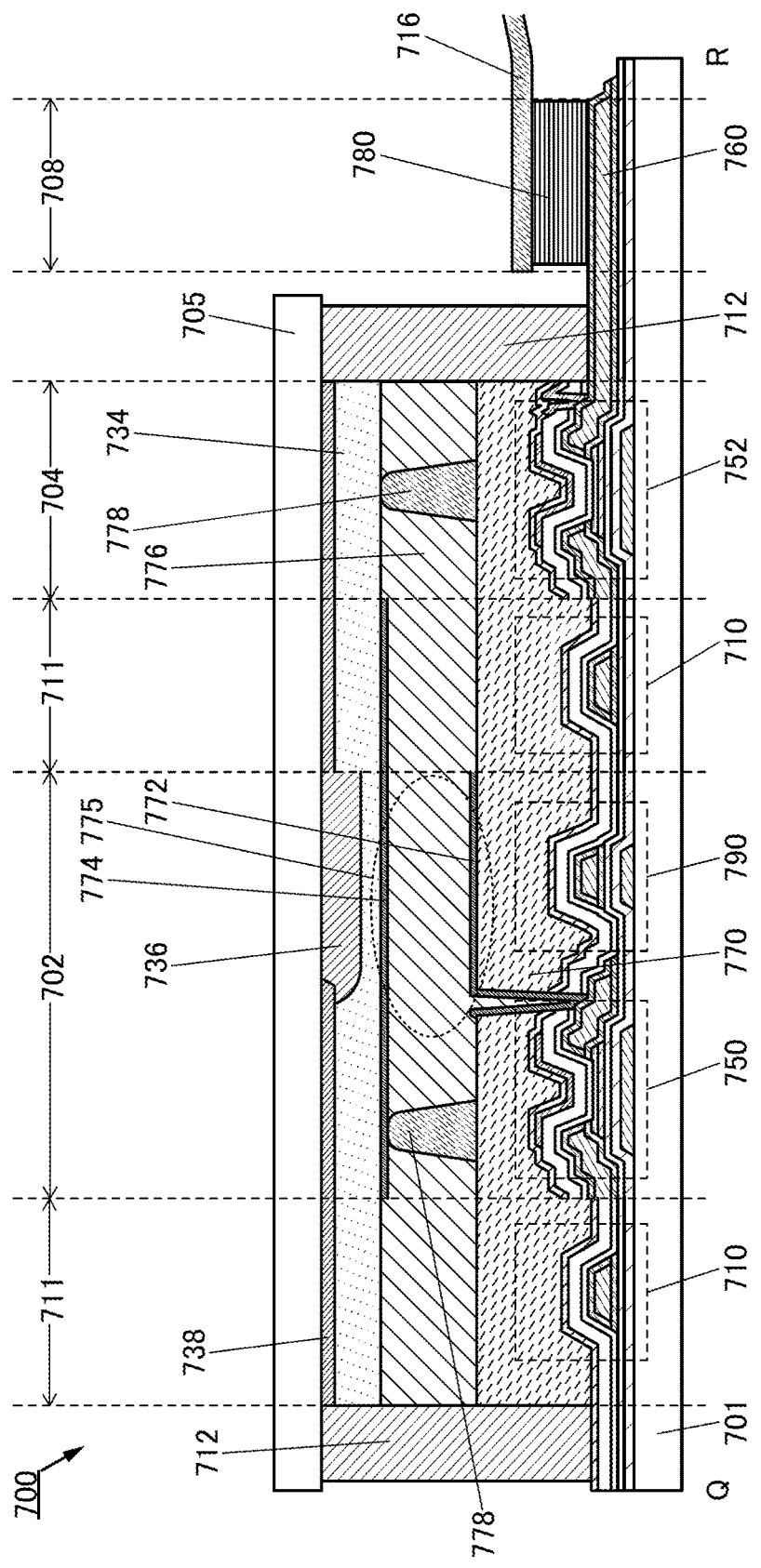
FIG. 9 A cross-sectional view illustrating a structure example of a display unit.
Figure 10:
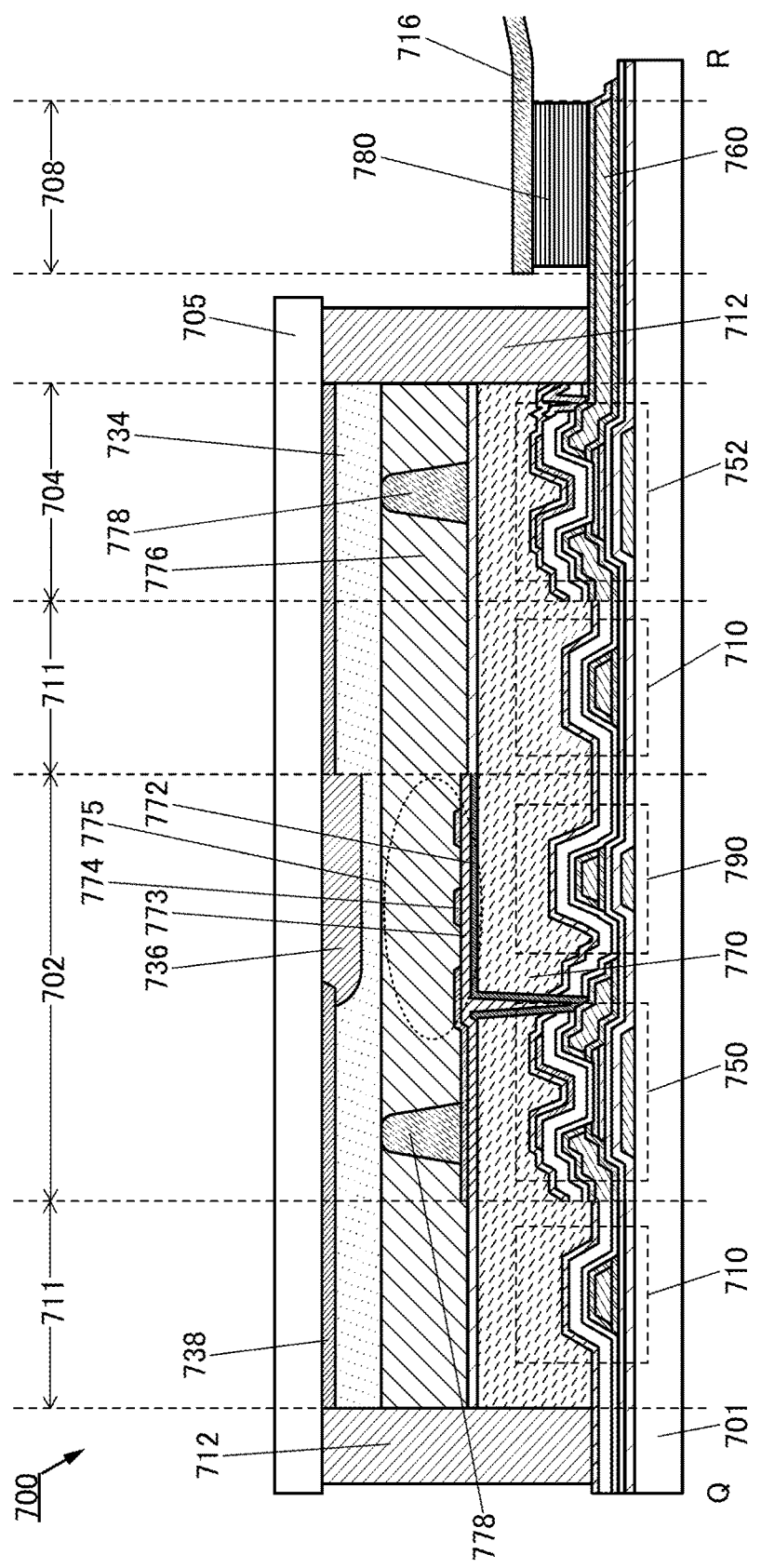
FIG. 10 A cross-sectional view illustrating a structure example of a display unit.

Structures using a liquid crystal element and an EL element as display elements are described below with reference to FIG. 9 to FIG. 11. Note that FIG. 9 and FIG. 10 are cross-sectional views taken along the dashed-dotted line Q-R illustrated in FIG. 8 and are structures using a liquid crystal element as a display element. In addition, FIG. 11 is a cross-sectional view taken along the dashed-dotted line Q-R illustrated in FIG. 8 and is a structure using an EL element as a display element.

Figure 11:
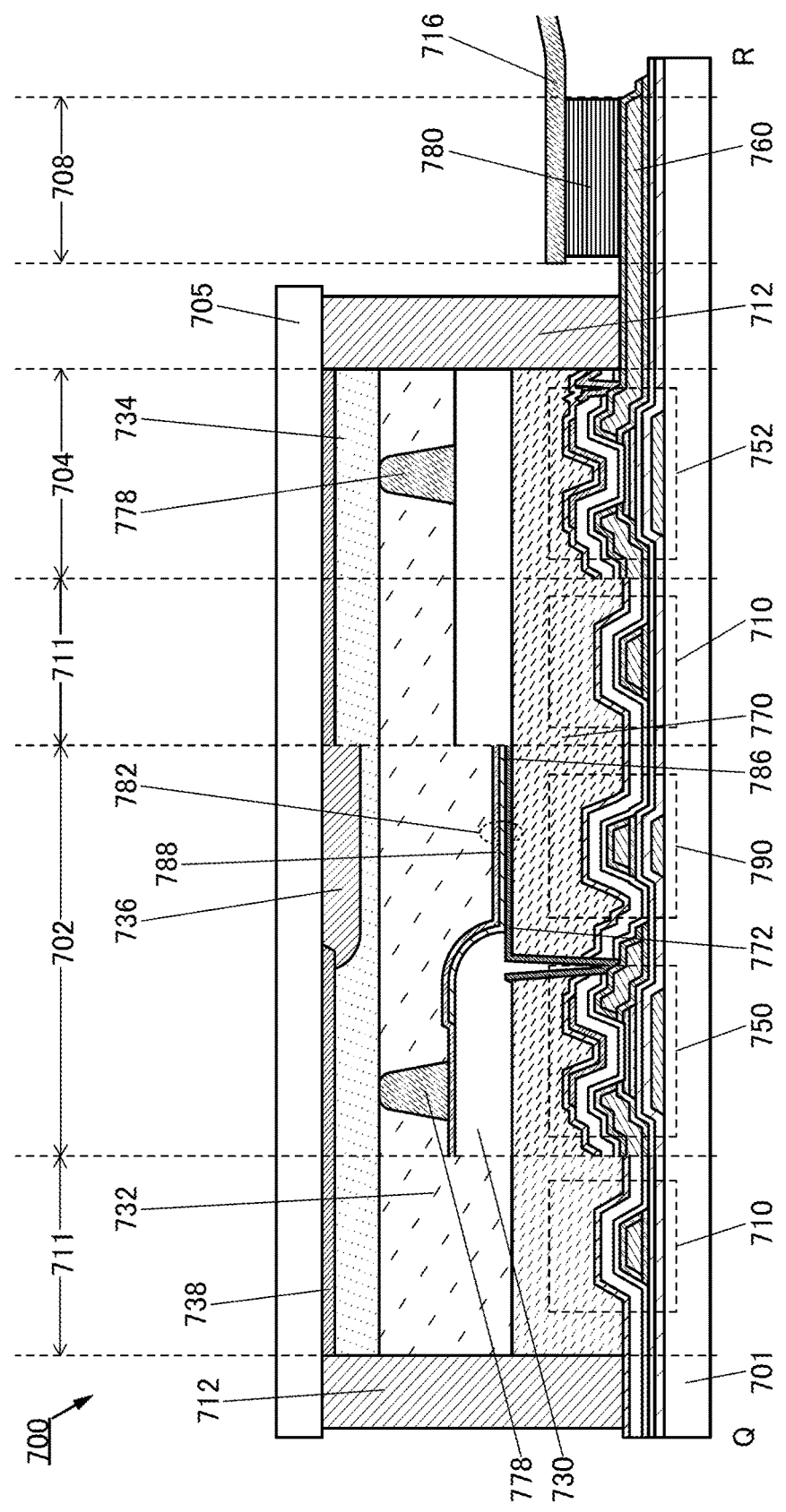
FIG. 11 A cross-sectional view illustrating a structure example of a display unit.

Portions common to FIG. 9 to FIG. 11 are described first, and then, different portions are described.

<Description of Common Portions Between Display Units>

The display units 700 illustrated in FIG. 9 to FIG. 11 each include a lead wiring portion 711, the pixel portion 702, the source driver circuit portion 704, and the FPC terminal portion 708. The lead wiring portion 711 includes the signal line 710. The pixel portion 702 includes a transistor 750 and a capacitor 790. The source driver circuit portion 704 includes a transistor 752.

In the transistor provided in each pixel, a metal oxide (an oxide semiconductor) is preferably used for a semiconductor layer where a channel is formed. This can increase the field-effect mobility of the transistor and thus reduce the size (occupation area) of the transistor as compared with the case where amorphous silicon is used. Accordingly, parasitic capacitance of the source lines and the gate lines can be small.

In particular, the use of a transistor including an oxide semiconductor provides various effects described below. For example, the transistor size (occupation area) can be small; thus, parasitic capacitance of the transistor itself can be small. Moreover, the aperture ratio can be improved, or the wiring width can be widened and wiring resistance can be low without reducing the aperture ratio as compared with a transistor using amorphous silicon. Furthermore, since the transistor including an oxide semiconductor can have a high on-state current, the period for writing to the pixel can be shortened. Owing to these effects, charge and discharge periods of the gate line and the source line can be shortened and the frame frequency can be increased.

Furthermore, since the transistor including an oxide semiconductor can have a significantly low off-state current, the holding period of a potential written to the pixel can be prolonged and the frame frequency can be reduced. For example, the frame frequency can be variable in a range from 0.1 Hz to 480 Hz inclusive. In a television device or the like, the frame frequency is preferably higher than or equal to 30 Hz and lower than or equal to 480 Hz, more preferably higher than or equal to 60 Hz and lower than or equal to 240 Hz.

Another effect from the use of a transistor having a significantly low off-state current is a reduction in the storage capacitor of the pixel. This can increase the aperture ratio of the pixel and shorten the period for writing to the pixel.

By reducing the electric resistance and capacitance of each source line as small as possible, driving at a higher frame frequency, a larger display unit, and the like can be achieved. Examples of methods of reducing the electric resistance and capacitance include using a low resistance material (e.g., copper or aluminum) as a material of the source line, making the thickness or width of the source line large, making the thickness of an interlayer insulating film between the source line and another wiring large, and making the intersecting area of the source line and another wiring small.

The transistor used in this embodiment includes a highly purified oxide semiconductor film in which formation of oxygen vacancies is suppressed. The transistor can have a low off-state current. Accordingly, the holding time of an electrical signal such as a data signal of image data can be made longer, and a writing interval can also be set longer. Accordingly, the frequency of refresh operations can be reduced, resulting in an effect of reducing power consumption.

The transistor used in this embodiment can have relatively high field-effect mobility and thus is capable of high-speed operation. For example, with the use of such a transistor capable of high-speed operation for a display unit, a switching transistor in a pixel portion and a driver transistor used in a driver circuit portion can be formed over one substrate. That is, a semiconductor device formed using a silicon wafer or the like is not additionally needed as a driver circuit; thus, the number of components of the semiconductor device can be reduced. Moreover, the use of the transistor capable of high-speed operation in the pixel portion can provide a high-quality image.

Furthermore, a transistor using a semiconductor including silicon in a semiconductor layer where a channel is formed can also be used. For example, a transistor using amorphous silicon, microcrystalline silicon, polycrystalline silicon, or the like can be used. In particular, amorphous silicon can be formed over a large substrate with a high yield, which is preferable. When amorphous silicon is used, hydrogenated amorphous silicon (denoted by a-Si:H in some cases) in which dangling bonds are terminated by hydrogen is preferably used.

The capacitor 790 includes a lower electrode that is formed through the same step as the step of processing a conductive film functioning as a first gate electrode included in the transistor 750, and an upper electrode that is formed through the same step as the step of processing a conductive film functioning as a second gate electrode included in the transistor 750. In addition, between the lower electrode and the upper electrode, an insulating film formed through the same step as the step of forming an insulating film functioning as a first gate insulating film included in the transistor 750, and an insulating film formed through the same step as the step of forming an insulating film functioning as a protective insulating film over the transistor 750 are provided. That is, the capacitor 790 has a stacked-layer structure in which the insulating films functioning as dielectric films are interposed between a pair of electrodes.

Furthermore, in FIG. 9 to FIG. 11, a planarization insulating film 770 is provided over the transistor 750, the transistor 752, and the capacitor 790.

Although FIG. 9 to FIG. 11 exemplify structures in which transistors having the same structures are used as the transistor 750 included in the pixel portion 702 and the transistor 752 included in the source driver circuit portion 704, the structure is not limited thereto. For example, different transistors may be used in the pixel portion 702 and the source driver circuit portion 704. Specifically, a structure in which a top-gate transistor is used in the pixel portion 702 and a bottom-gate transistor is used in the source driver circuit portion 704, a structure in which a bottom-gate transistor is used in the pixel portion 702 and a top-gate transistor is used in the source driver circuit portion 704, and the like can be employed. Note that the source driver circuit portion 704 described above may be replaced with a gate driver circuit portion.

In addition, the signal line 710 is formed through the same step as conductive films functioning as source electrodes and drain electrodes of the transistors 750 and 752. In the case where a material containing a copper element is used for the signal line 710, for example, signal delay or the like due to wiring resistance is reduced, which enables display on a large screen.

In addition, the FPC terminal portion 708 includes a connection electrode 760, an anisotropic conductive film 780, and the FPC 716. Note that the connection electrode 760 is formed through the same step as the conductive films functioning as the source electrodes and the drain electrodes of the transistors 750 and 752. Moreover, the connection electrode 760 is electrically connected to a terminal included in the FPC 716 through the anisotropic conductive film 780.

For example, glass substrates can be used as the first substrate 701 and the second substrate 705. Alternatively, flexible substrates may be used as the first substrate 701 and the second substrate 705. Examples of the flexible substrate include a plastic substrate.

A structure body 778 is provided between the first substrate 701 and the second substrate 705. The structure body 778, which is a columnar spacer, is provided to control the distance (cell gap) between the first substrate 701 and the second substrate 705. Note that a spherical spacer may also be used as the structure body 778.

Furthermore, a light-blocking film 738 functioning as a black matrix, a coloring film 736 functioning as a color filter, and an insulating film 734 in contact with the light-blocking film 738 and the coloring film 736 are provided on the second substrate 705 side.

<Structure Example of Display Unit Using Liquid Crystal Element>

The display unit 700 illustrated in FIG. 9 includes a liquid crystal element 775. The liquid crystal element 775 includes a conductive film 772, a conductive film 774, and a liquid crystal layer 776. The conductive film 774 is provided on the second substrate 705 side and has a function as a counter electrode. The display unit 700 illustrated in FIG. 9 is capable of displaying an image in such a manner that transmission or non-transmission of light is controlled by a change in the alignment state of the liquid crystal layer 776 depending on a voltage applied to the conductive film 772 and the conductive film 774.

In addition, the conductive film 772 is electrically connected to the conductive film functioning as the source electrode or the drain electrode included in the transistor 750. The conductive film 772 is formed over the planarization insulating film 770 and functions as a pixel electrode, i.e., one electrode of the display element.

A conductive film that has a property of transmitting visible light or a conductive film that has a property of reflecting visible light can be used as the conductive film 772. For example, a material containing one kind selected from indium (In), zinc (Zn), and tin (Sn) is preferably used for the conductive film that has a visible-light-transmitting property. As the conductive film that has a property of reflecting visible light, for example, a material containing aluminum or silver is preferably used.

In the case where the conductive film that has a property of reflecting visible light is used as the conductive film 772, the display unit 700 is a reflective liquid crystal display unit.

In the case where the conductive film that has a property of transmitting visible light is used as the conductive film 772, the display unit 700 is a transmissive liquid crystal display unit. In the case of a reflective liquid crystal display unit, a polarizing plate is provided on the viewer side. On the other hand, in the case of a transmissive liquid crystal display unit, a pair of polarizing plates between which a liquid crystal element is sandwiched is provided.

Furthermore, a method for driving a liquid crystal element can be changed with the change in the structure over the conductive film 772. FIG. 10 illustrates an example of this case. The display unit 700 illustrated in FIG. 10 is an example of a structure in which a horizontal electric field mode (e.g., an FFS mode) is used as a driving mode of the liquid crystal element. In the structure illustrated in FIG. 10, an insulating film 773 is provided over the conductive film 772, and the conductive film 774 is provided over the insulating film 773. In this case, the conductive film 774 has a function of a common electrode, and an electric field generated between the conductive film 772 and the conductive film 774 through the insulating film 773 can control the alignment state in the liquid crystal layer 776.

Although not illustrated in FIG. 9 and FIG. 10, a structure in which either one or both of the conductive film 772 and the conductive film 774 are provided with an alignment film on a side in contact with the liquid crystal layer 776 may be employed. Furthermore, although not illustrated in FIG. 9 and FIG. 10, an optical component (an optical substrate) and the like, such as a polarizing component, a retardation component, or an anti-reflection component, may be provided as appropriate. For example, circular polarization may be employed by using a polarizing substrate and a retardation substrate. In addition, a backlight, a side light, or the like may be used as a light source.

In the case where a liquid crystal element is used as the display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

In the case of employing a horizontal electric field mode, liquid crystal exhibiting a blue phase for which an alignment film is not used may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition that contains a liquid crystal exhibiting the blue phase and a chiral material has a short response time and optical isotropy, which makes the alignment process unneeded. Since the alignment film does not need to be provided, rubbing treatment is not necessary; accordingly, electrostatic discharge damage caused by the rubbing treatment can be prevented, reducing defects and damage of a liquid crystal display unit in the manufacturing process. Moreover, the liquid crystal material exhibiting the blue phase has small viewing angle dependence.

Furthermore, in the case where a liquid crystal element is used as the display element, a TN (Twisted Nematic) mode, an IPS (In-Plane-Switching) mode, an FFS (Fringe Field Switching) mode, an ASM (Axially Symmetric aligned Micro-cell) mode, an OCB (Optical Compensated Birefringence) mode, an FLC (Ferroelectric Liquid Crystal) mode, an AFLC (AntiFerroelectric Liquid Crystal) mode, or the like can be used.

Furthermore, a normally black liquid crystal display unit, for example, a transmissive liquid crystal display unit employing a vertical alignment (VA) mode may be used. Some examples can be given as a vertical alignment mode, which include an MVA (Multi-Domain Vertical Alignment) mode, a PVA (Patterned Vertical Alignment) mode, or an ASV mode.

<Structure Example of Display Unit Using Light-Emitting Element>

The display unit 700 illustrated in FIG. 11 includes a light-emitting element 782. The light-emitting element 782 includes the conductive film 772, an EL layer 786, and a conductive film 788. The display unit 700 illustrated in FIG. 11 can display an image by light emission from the EL layer 786 included in the light-emitting element 782 provided in each pixel. Note that the EL layer 786 contains an organic compound or an inorganic compound such as a quantum dot.

Examples of materials that can be used for an organic compound include a fluorescent material and a phosphorescent material. In addition, examples of materials that can be used for a quantum dot include a colloidal quantum dot material, an alloyed quantum dot material, a core-shell quantum dot material, and a core quantum dot material. A material containing elements belonging to Groups 12 and 16, elements belonging to Groups 13 and 15, or elements belonging to Groups 14 and 16, may be used. Alternatively, a quantum dot material containing an element such as cadmium (Cd), selenium (Se), zinc (Zn), sulfur (S), phosphorus (P), indium (In), tellurium (Te), lead (Pb), gallium (Ga), arsenic (As), or aluminum (Al) may be used.

In the display unit 700 illustrated in FIG. 11, an insulating film 730 is provided over the planarization insulating film 770 and the conductive film 772. The insulating film 730 covers part of the conductive film 772. Note that the light-emitting element 782 has a top-emission structure. Therefore, the conductive film 788 has a light-transmitting property and transmits light emitted from the EL layer 786. Note that although the top-emission structure is exemplified in this embodiment, the structure is not limited thereto. For example, a bottom-emission structure in which light is emitted to the conductive film 772 side or a dual-emission structure in which light is emitted to both the conductive film 772 and the conductive film 788 can also be employed.

In addition, the coloring film 736 is provided at a position overlapping with the light-emitting element 782, and the light-blocking film 738 is provided at a position overlapping with the insulating film 730, in the lead wiring portion 711, and in the source driver circuit portion 704. The coloring film 736 and the light-blocking film 738 are covered with the insulating film 734. A space between the light-emitting element 782 and the insulating film 734 is filled with a sealing film 732. Note that although the structure in which the coloring film 736 is provided is exemplified in the display unit 700 illustrated in FIG. 11, the structure is not limited thereto. For example, a structure in which the coloring film 736 is not provided may also be employed in the case where the EL layer 786 is formed into an island shape per pixel, i.e., formed by separate coloring.

<Structure Example of Display Unit Provided with Input/Output Device>

The display unit 700 illustrated in each of FIG. 9 to FIG. 11 may be provided with an input/output device. Examples of the input/output device include a touch panel.

Figure 12:
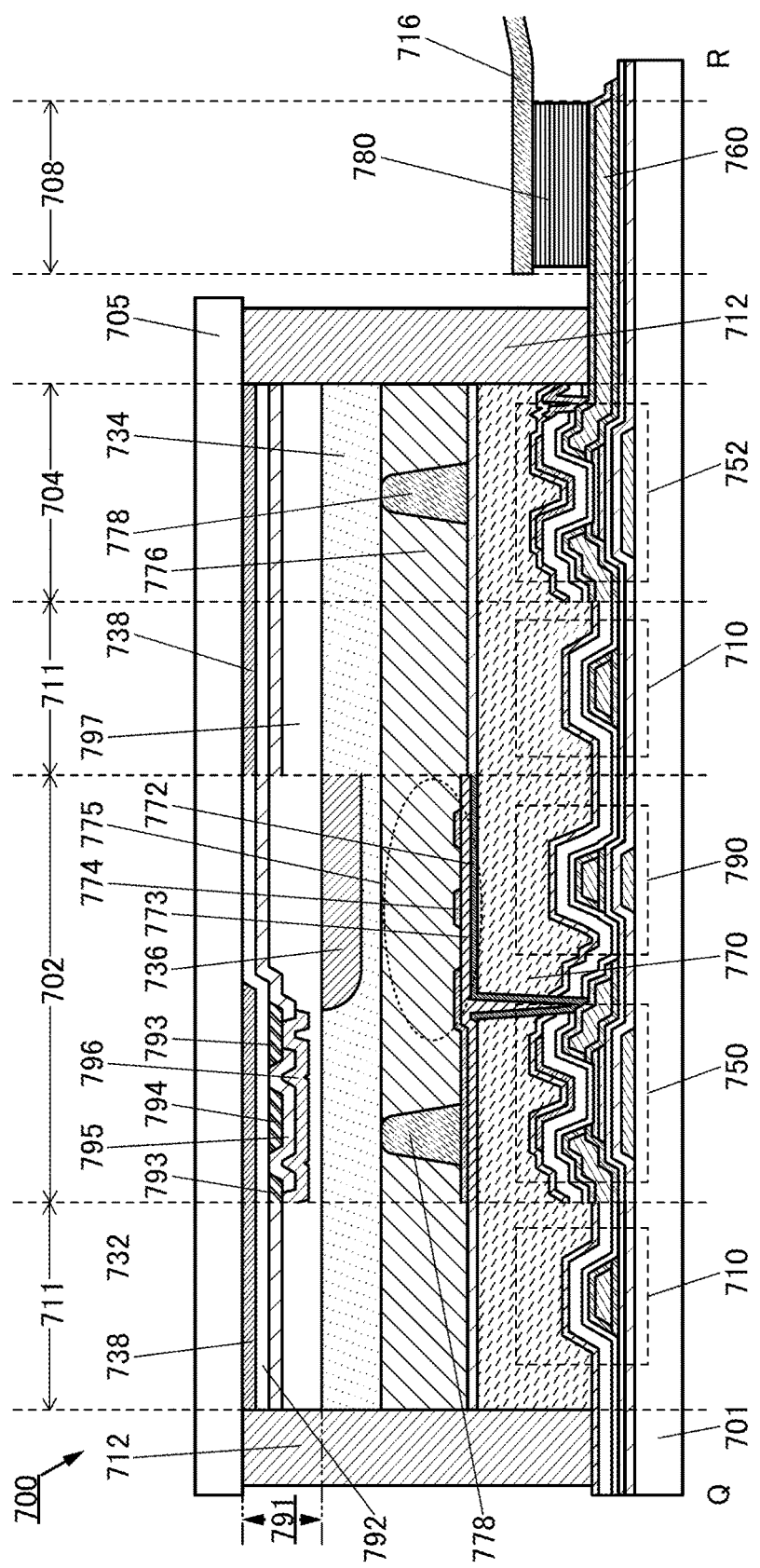
FIG. 12 A cross-sectional view illustrating a structure example of a display unit.
Figure 13:
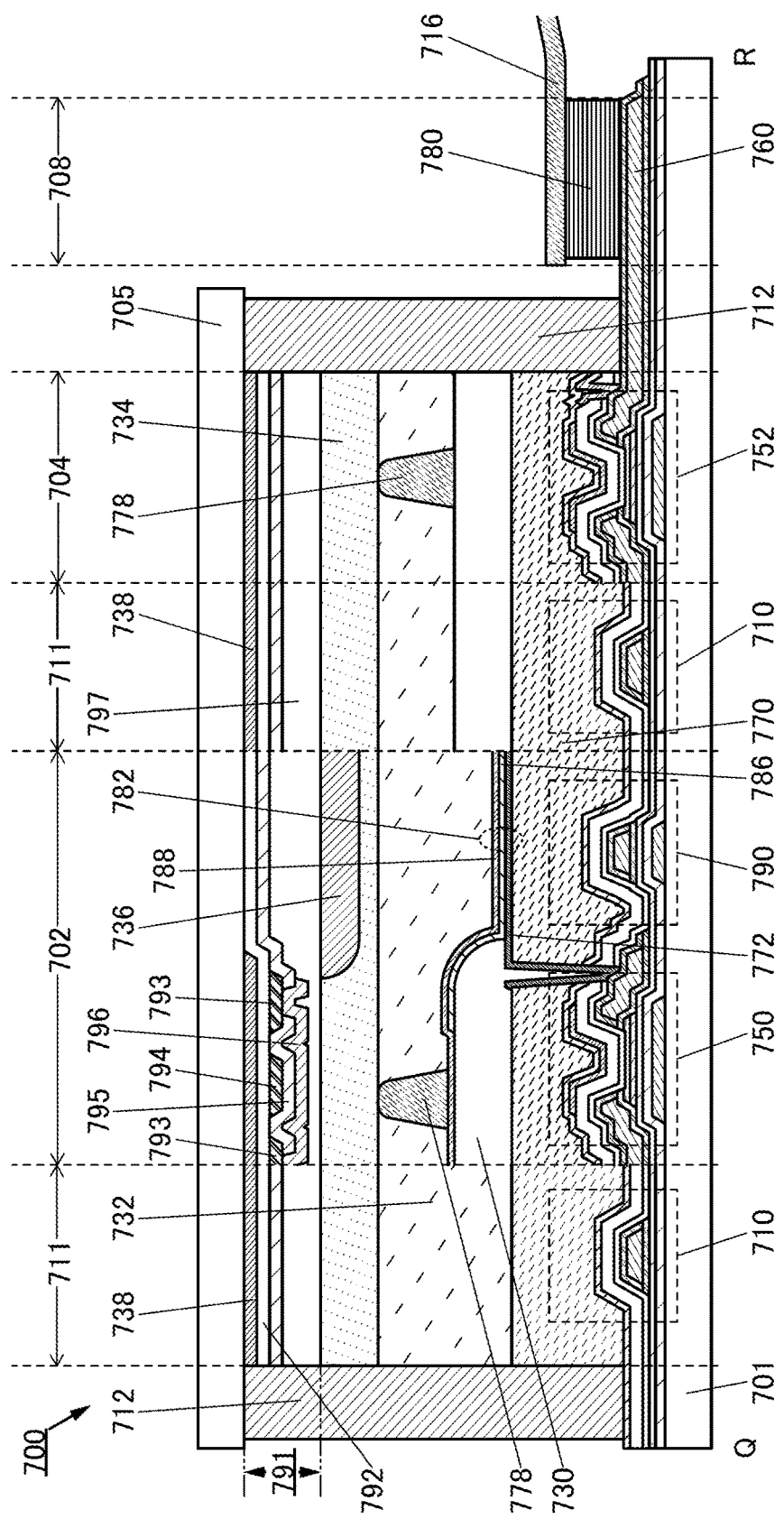
FIG. 13 A cross-sectional view illustrating a structure example of a display unit.

FIG. 12 illustrates a structure in which the display unit 700 illustrated in FIG. 10 is provided with a touch panel 791, and FIG. 13 illustrates a structure in which the display unit 700 illustrated in FIG. 11 is provided with the touch panel 791.

FIG. 12 is a cross-sectional view of the structure in which the display unit 700 illustrated in FIG. 10 is provided with the touch panel 791, and FIG. 13 is a cross-sectional view of the structure in which the display unit 700 illustrated in FIG. 11 is provided with the touch panel 791.

First, the touch panel 791 illustrated in FIG. 12 and FIG. 13 will be described below.

The touch panel 791 illustrated in FIG. 12 and FIG. 13 is what is called an in-cell touch panel provided between the substrate 705 and the coloring film 736. The touch panel 791 is formed on the substrate 705 side before the light-blocking film 738 and the coloring film 736 are formed.

Note that the touch panel 791 includes the light-blocking film 738, an insulating film 792, an electrode 793, an electrode 794, an insulating film 795, an electrode 796, and an insulating film 797. The touch panel 791 can sense a change in the capacitance between the electrode 793 and the electrode 794 that can be caused by approach of a sensing target such as a finger or a stylus, for example.

In addition, a portion in which the electrode 793 intersects with the electrode 794 is illustrated in the upper portion of the transistor 750 illustrated in FIG. 12 and FIG. 13. Through openings provided in the insulating film 795, the electrode 796 is electrically connected to the two electrodes 793 between which the electrode 794 is sandwiched. Note that a structure in which a region provided with the electrode 796 is provided in the pixel portion 702 is exemplified in FIG. 12 and FIG. 13; however, the structure is not limited thereto and the electrode 796 may be formed in the source driver circuit portion 704, for example.

The electrode 793 and the electrode 794 are provided in a region overlapping with the light-blocking film 738. As illustrated in FIG. 13, it is preferable that the electrode 793 be provided so as not to overlap with a light-emitting element 782. As illustrated in FIG. 12, it is preferable that the electrode 793 be provided so as not to overlap with a liquid crystal element 775. In other words, the electrode 793 has an opening in a region overlapping with the light-emitting element 782 and the liquid crystal element 775. That is, the electrode 793 has a mesh shape. With such a structure, the electrode 793 does not block light emitted from the light-emitting element 782. Alternatively, the electrode 793 does not block light transmitted through the liquid crystal element 775. Thus, since a reduction in luminance due to the placement of the touch panel 791 is extremely small, a display unit with high visibility and low power consumption can be obtained. Note that the electrode 794 can have a similar structure.

Since the electrode 793 and the electrode 794 do not overlap with the light-emitting element 782, a metal material with low visible light transmittance can be used for the electrode 793 and the electrode 794. Alternatively, since the electrode 793 and the electrode 794 do not overlap with the liquid crystal element 775, a metal material with low visible light transmittance can be used for the electrode 793 and the electrode 794.

Accordingly, the resistance of the electrode 793 and the electrode 794 can be reduced as compared with an electrode using an oxide material with high visible light transmittance, so that the sensitivity of the touch panel can be increased.

For example, a conductive nanowire may be used for the electrodes 793, 794, and 796. The nanowire has a mean diameter of greater than or equal to 1 nm and less than or equal to 100 nm, preferably greater than or equal to 5 nm and less than or equal to 50 nm, further preferably greater than or equal to 5 nm and less than or equal to 25 nm. Moreover, as the above nanowire, a metal nanowire such as an Ag nanowire, a Cu nanowire, or an Al nanowire, a carbon nanotube, or the like is used. For example, in the case where an Ag nanowire is used for any one of or all of the electrodes 793, 794, and 796, the visible light transmittance can be greater than or equal to 89% and the sheet resistivity can be greater than or equal to 40 Ω/square and less than or equal to 100 Ω/square.

Although the structure of the in-cell touch panel is exemplified in FIG. 12 and FIG. 13, the structure is not limited thereto. For example, a touch panel formed over the display unit 700, what is called an on-cell touch panel, or a touch panel attached to the display unit 700, what is called an out-cell touch panel, may be used.

In this manner, the display unit of one embodiment of the present invention can be used in combination with various types of touch panels.

Note that at least part of this embodiment can be implemented in combination with any of the other embodiments described in this specification as appropriate.

Embodiment 3

In this embodiment, a display unit that can be used for a display device of one embodiment of the present invention is described with reference to FIG. 14.

<Circuit Structure Example of Display Unit>

A display unit illustrated in FIG. 14(A) includes a region including pixels of display elements (hereinafter referred to as a pixel portion 502), a circuit portion being provided outside the pixel portion 502 and including a circuit for driving the pixels (hereinafter referred to as a driver circuit portion 504), circuits each having a function of protecting an element (hereinafter referred to as protection circuits 506), and a terminal portion 507. Note that a structure in which the protection circuits 506 are not provided may be employed.

Part or the whole of the driver circuit portion 504 is desirably formed over the same substrate as the pixel portion 502. Thus, the number of components and the number of terminals can be reduced. In the case where part or the whole of the driver circuit portion 504 is not formed over the same substrate as the pixel portion 502, the part or the whole of the driver circuit portion 504 can be mounted by COG or TAB (Tape Automated Bonding).

The pixel portion 502 includes a plurality of circuits for driving display elements arranged in X rows (X is a natural number of 2 or more) and Y columns (Y is a natural number of 2 or more) (hereinafter referred to as pixel circuits 501), the driver circuit portion 504 includes driver circuits such as a circuit for outputting a signal (scan signal) to select a pixel (hereinafter referred to as a gate driver 504a) and a circuit for supplying a signal (data signal) to drive a display element in a pixel (hereinafter referred to as a source driver 504b).

The gate driver 504a includes a shift register or the like. A signal for driving the shift register is input through the terminal portion 507 to the gate driver 504a, and the gate driver 504a outputs a signal. For example, a start pulse signal, a clock signal, or the like is input to the gate driver 504a, and the gate driver 504a outputs a pulse signal. The gate driver 504a has a function of controlling the potentials of wirings supplied with scan signals (hereinafter referred to as gate lines GL_1 to GL_X). Note that a plurality of gate drivers 504a may be provided and the gate lines GL_1 to GL_X may be separately controlled by the plurality of gate drivers 504a. Alternatively, the gate driver 504a has a function of supplying an initialization signal. However, without being limited thereto, the gate driver 504a can supply another signal.

The source driver 504b includes a shift register or the like. A signal (image data) from which a data signal is derived, as well as a signal for driving the shift register, is input to the source driver 504b through the terminal portion 507. The source driver 504b has a function of generating a data signal to be written to the pixel circuit 501 on the basis of the image data. In addition, the source driver 504b has a function of controlling output of a data signal in response to a pulse signal obtained by input of a start pulse, a clock signal, or the like. Furthermore, the source driver 504b has a function of controlling the potentials of wirings supplied with data signals (hereinafter referred to as source lines DL_1 to DL_Y). Alternatively, the source driver 504b has a function of supplying an initialization signal. However, without being limited thereto, the source driver 504b can supply another signal.

The source driver 504b is formed using a plurality of analog switches, for example. The source driver 504b can output, as the data signals, signals obtained by time-dividing the image data by sequentially turning on the plurality of analog switches. In addition, the source driver 504b may be formed using a shift register or the like.

A pulse signal and a data signal are inputted to each of the plurality of pixel circuits 501 through one of the plurality of gate lines GL supplied with scan signals and one of the plurality of source lines DL supplied with data signals, respectively. In addition, writing and holding of data of the data signal to and in each of the plurality of pixel circuits 501 are controlled by the gate driver 504a. For example, to the pixel circuit 501 in the m-th row and the n-th column, a pulse signal is input from the gate driver 504a through the gate line GL_m (m is a natural number less than or equal to X) and a data signal is input from the source driver 504b through the source line DL_n (n is a natural number less than or equal to Y) in accordance with the potential of the gate line GL_m.

Figure 14A:
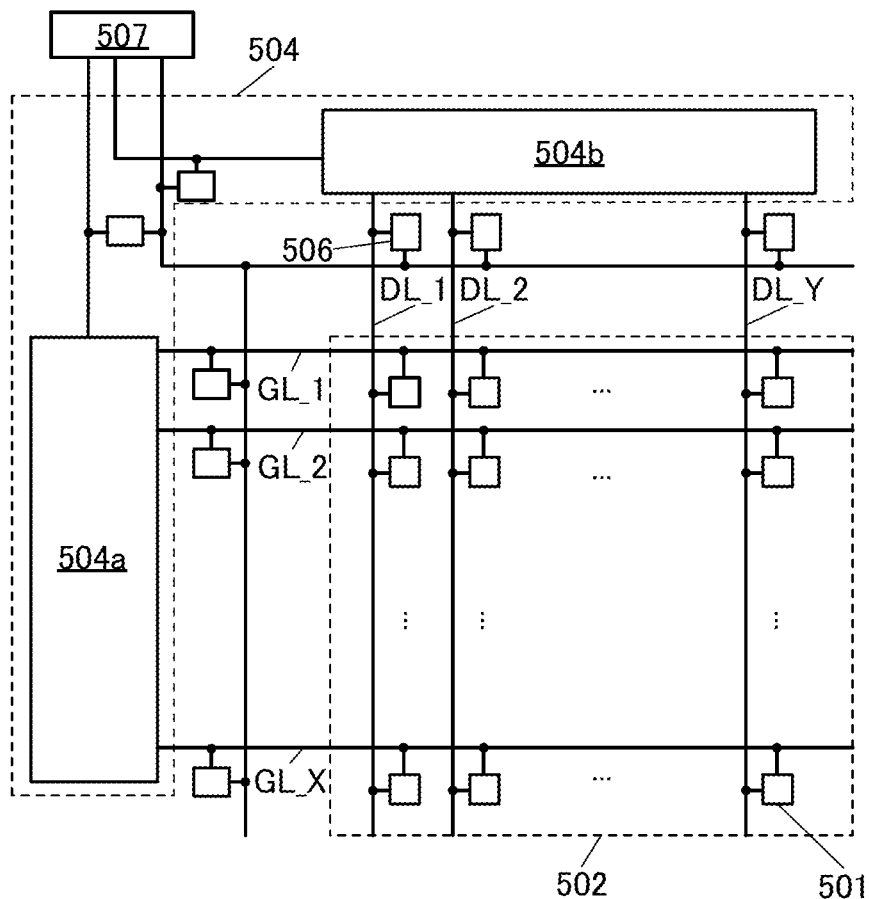
FIG. 14 (A) A block diagram illustrating a structure example of a display unit, (B) A circuit diagram illustrating a structure example of a display unit, (C) A circuit diagram illustrating a structure example of a display unit.

The protection circuit 506 illustrated in FIG. 14(A) is connected to, for example, the gate line GL, which is a wiring between the gate driver 504a and the pixel circuit 501. Alternatively, the protection circuit 506 is connected to the source line DL, which is a wiring between the source driver 504b and the pixel circuit 501. Alternatively, the protection circuit 506 can be connected to a wiring between the gate driver 504a and the terminal portion 507. Alternatively, the protection circuit 506 can be connected to a wiring between the source driver 504b and the terminal portion 507. Note that the terminal portion 507 refers to a portion provided with terminals for inputting power, control signals, and image data to the display unit from external circuits.

The protection circuit 506 is a circuit that makes, when a potential out of a certain range is applied to the wiring connected to the protection circuit, the wiring and another wiring be in conduction state.

As illustrated in FIG. 14(A), the protection circuit 506 is provided for each of the pixel portion 502 and the driver circuit portion 504, so that the resistance of the display unit to overcurrent generated by ESD (Electro Static Discharge) or the like can be improved. Note that the structure of the protection circuits 506 is not limited thereto; for example, a structure in which the protection circuit 506 is connected to the gate driver 504a or a structure in which the protection circuit 506 is connected to the source driver 504*b* can be employed. Alternatively, a structure in which the protection circuit 506 is connected to the terminal portion 507 can be employed.

In FIG. 14(A), an example in which the driver circuit portion 504 is formed by the gate driver 504*a* and the source driver 504*b* is shown; however, the structure is not limited thereto. For example, a structure may be employed in which only the gate driver 504*a* is formed and a separately prepared substrate where a source driver circuit is formed (e.g., a driver circuit substrate formed with a single crystal semiconductor film or a polycrystalline semiconductor film) is mounted.

Figure 15:
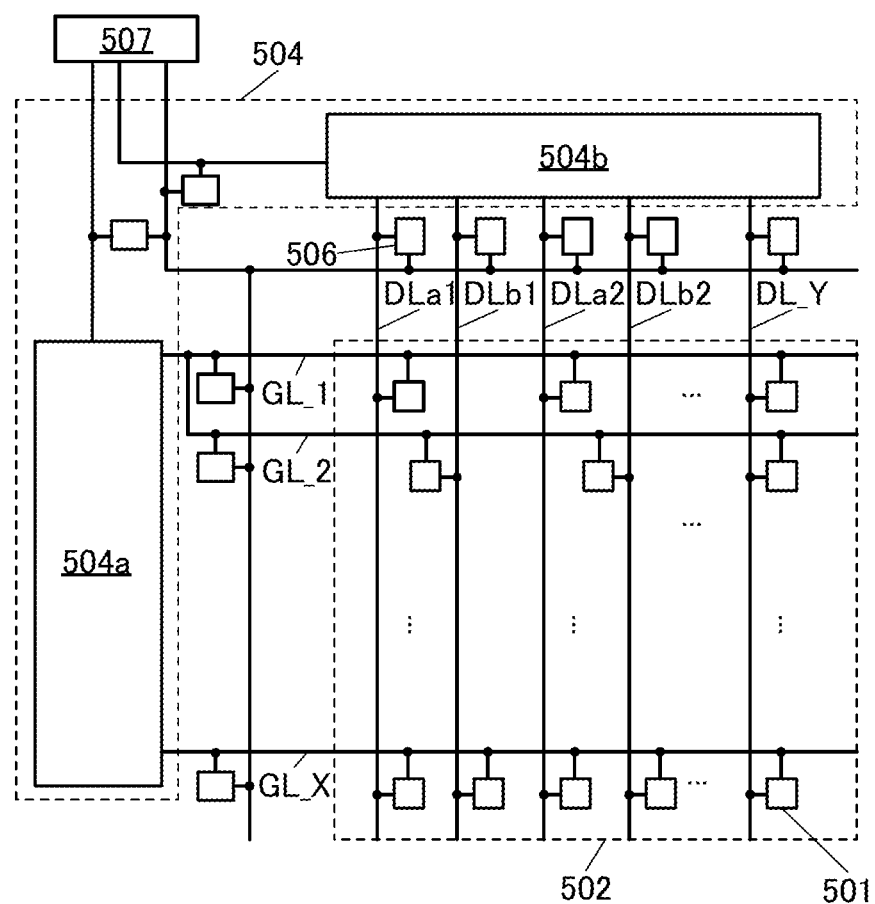
FIG. 15 A block diagram illustrating a structure example of a display unit.

Here, FIG. 15 illustrates a structure different from that in FIG. 14(A). In FIG. 15, a pair of source lines (e.g., a source line DLa1 and a source line DLb1) is provided so that a plurality of pixels arranged in the source line direction are sandwiched therebetween. In addition, two adjacent gate lines (e.g., a gate line GL_1 and a gate line GL_2) are electrically connected to each other.

Furthermore, pixels connected to the gate line GL_1 are connected to one of the source lines (such as the source line DLa1 or a source line DLa2), and pixels connected to the gate line GL_2 are connected to the other source line (such as the source line DLb1 or a source line DLb2).

In such a structure, two gate lines can be selected concurrently. Accordingly, one horizontal period can have a length twice that in the structure illustrated in FIG. 14(A). This facilitates an increase in resolution and an increase in screen size of a display unit.

Furthermore, the plurality of pixel circuits 501 illustrated in FIG. 14 (A) can have the structure illustrated in FIG. 14 (B), for example.

Figure 14B:
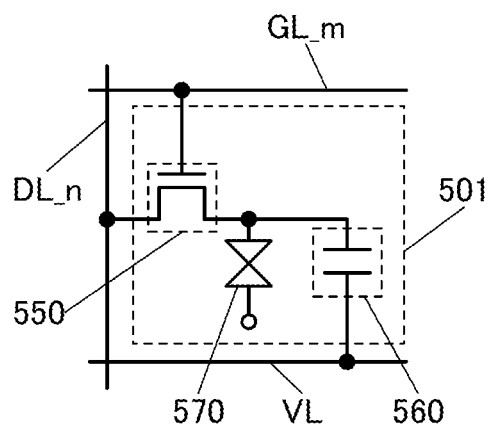

The pixel circuit 501 illustrated in FIG. 14(B) includes a liquid crystal element 570, a transistor 550, and a capacitor 560.

The potential of one of a pair of electrodes of the liquid crystal element 570 is set in accordance with the specifications of the pixel circuit 501 as appropriate. The alignment state of the liquid crystal element 570 is set depending on written data. Note that a common potential may be supplied to one of the pair of electrodes of the liquid crystal element 570 included in each of the plurality of pixel circuits 501. Moreover, a different potential may be supplied to one of the pair of electrodes of the liquid crystal element 570 of the pixel circuit 501 in each row.

For example, as a driving method of the display unit including the liquid crystal element 570, a TN mode, an STN mode, a VA mode, an ASM (Axially Symmetric Aligned Micro-cell) mode, an OCB (Optically Compensated Birefringence) mode, an FLC (Ferroelectric Liquid Crystal) mode, an AFLC (AntiFerroelectric Liquid Crystal) mode, an MVA mode, a PVA (Patterned Vertical Alignment) mode, an IPS mode, an FFS mode, a TBA (Transverse Bend Alignment) mode, and the like may be employed. As examples of the driving method of the display unit, an ECB (Electrically Controlled Birefringence) mode, a PDLC (Polymer Dispersed Liquid Crystal) mode, a PNLC (Polymer Network Liquid Crystal) mode, and a guest-host mode, and the like can be given, in addition to the above driving methods. However, without being limited to the above, a variety of liquid crystal elements and the driving methods thereof can be used.

In the pixel circuit 501 in the m-th row and the n-th column, one of a source electrode and a drain electrode of the transistor 550 is electrically connected to the source line DL_n, and the other is electrically connected to the other of the pair of electrodes of the liquid crystal element 570. In addition, a gate electrode of the transistor 550 is electrically connected to the gate line GL_m. The transistor 550 has a function of controlling writing of data of a data signal by being turned on or turned off.

One of a pair of electrodes of the capacitor 560 is electrically connected to a wiring to which a potential is supplied (hereinafter referred to as a potential supply line VL), and the other is electrically connected to the other of the pair of electrodes of the liquid crystal element 570. Note that the value of the potential of the potential supply line VL is set in accordance with the specifications of the pixel circuit 501 as appropriate. The capacitor 560 has a function of a storage capacitor for holding written data.

For example, in the display unit including the pixel circuit 501 in FIG. 14(B), the pixel circuits 501 in each row are sequentially selected by, for example, the gate driver 504*a* illustrated in FIG. 14(A), whereby the transistors 550 are turned on and data of a data signal is written.

When the transistors 550 are turned off, the pixel circuits 501 in which the data has been written are brought into a holding state. This operation is sequentially performed row by row; thus, an image can be displayed.

Furthermore, the plurality of pixel circuits 501 illustrated in FIG. 14 (A) can have the structure illustrated in FIG. 14 (C), for example.

The pixel circuit 501 illustrated in FIG. 14 (C) includes transistors 552 and 554, a capacitor 562, and a light-emitting element 572.

One of a source electrode and a drain electrode of the transistor 552 is electrically connected to a wiring to which a data signal is supplied (hereinafter referred to as a signal line DL_n). Moreover, a gate electrode of the transistor 552 is electrically connected to a wiring to which a gate signal is supplied (hereinafter referred to as the gate line GL_m).

The transistor 552 has a function of controlling writing of data of a data signal by being turned on or turned off.

One of a pair of electrodes of the capacitor 562 is electrically connected to a wiring to which a potential is supplied (hereinafter referred to as a potential supply line VL_a), and the other is electrically connected to the other of the source electrode and the drain electrode of the transistor 552.

The capacitor 562 has a function of a storage capacitor for holding written data.

One of a source electrode and a drain electrode of the transistor 554 is electrically connected to the potential supply line VL_a. Furthermore, a gate electrode of the transistor 554 is electrically connected to the other of the source electrode and the drain electrode of the transistor 552.

One of an anode and a cathode of the light-emitting element 572 is electrically connected to a potential supply line VL_b, and the other is electrically connected to the other of the source electrode and the drain electrode of the transistor 554.

As the light-emitting element 572, an organic electroluminescent element (also referred to as an organic EL element) can be used, for example. Note that the light-emitting element 572 is not limited thereto; an inorganic EL element formed of an inorganic material or the like may be used.

Note that a high power supply potential VDD is supplied to one of the potential supply line VL_a and the potential supply line VL_b, and a low power supply potential VSS is supplied to the other.

Figure 14C:
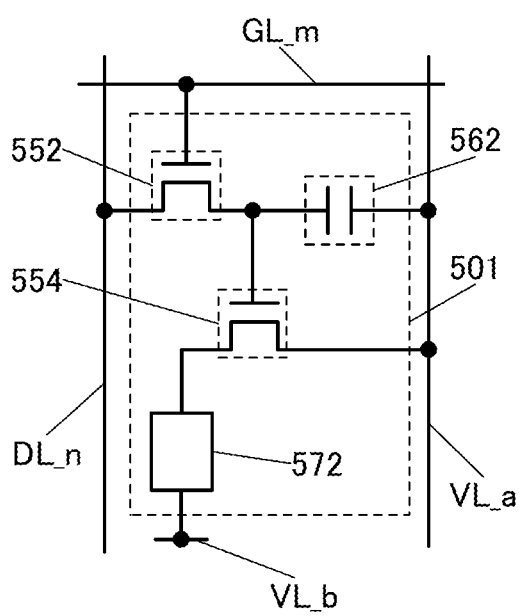

In the display unit including the pixel circuit 501 in FIG. 14(C), the pixel circuits 501 in each row are sequentially selected by, for example, the gate driver 504*a* illustrated in FIG. 14(A), whereby the transistors 552 are turned on and data of a data signal is written.

When the transistors 552 are turned off, the pixel circuits 501 in which the data has been written are brought into a holding state. Furthermore, the amount of current flowing between the source electrode and the drain electrode of the transistor 554 is controlled in accordance with the potential of the written data signal, and the light-emitting element 572 emits light with a luminance corresponding to the amount of flowing current. This operation is sequentially performed row by row; thus, an image can be displayed.

Note that at least part of this embodiment can be implemented in combination with any of the other embodiments described in this specification as appropriate.

Embodiment 4

In this embodiment, electronic devices of one embodiment of the present invention will be described with reference to drawings.

The display device 10 or the display unit 20 described in the above embodiment can be mounted on electronic devices exemplified below. Thus, high resolution can be realized, and an electronic device in which an operation method is optimized in accordance with the resolution and the frame frequency of a content and display is performed with low power consumption can be provided.

An image with, for example, full high definition, ultra high definition, super high definition, or definition higher than them can be displayed on a display portion of the electronic device of one embodiment of the present invention.

Examples of the electronic devices include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

Furthermore, the electronic device of one embodiment of the present invention can be incorporated along an inner wall, an outer wall, or the like of a house or a building.

The electronic device of one embodiment of the present invention may include an antenna. When a signal is received by the antenna, the electronic device can display a video, data, or the like on the display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radioactive rays, flow rate, humidity, gradient, oscillation, a smell, or infrared rays).

The electronic device of one embodiment of the present invention can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 16A:
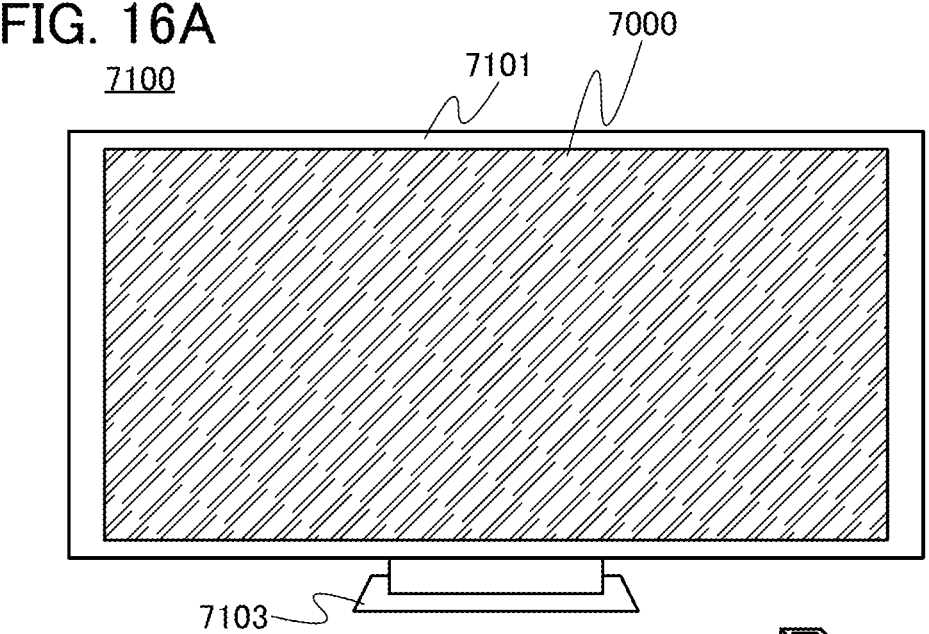
FIGS. 16A-16C Diagrams illustrating structures of electronic devices.

FIG. 16(A) illustrates an example of a television device. In a television device 7100, a display portion 7000 is incorporated in a housing 7101. Here, a structure in which the housing 7101 is supported by a stand 7103 is illustrated.

In FIG. 16(A), the display device 10 of one embodiment of the present invention can be used for the television device 7100.

Operation of the television device 7100 illustrated in FIG. 16(A) can be performed with an operation switch provided in the housing 7101 or a separate remote controller 7111. Alternatively, the display portion 7000 may include a touch sensor, and can be operated by touch on the display portion 7000 with a finger or the like. The remote controller 7111 may be provided with a display portion for displaying data output from the remote controller 7111. With operation keys or a touch panel provided in the remote controller 7111, channels and volume can be operated and videos displayed on the display portion 7000 can be operated.

Note that the television device 7100 has a structure in which a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 16B:
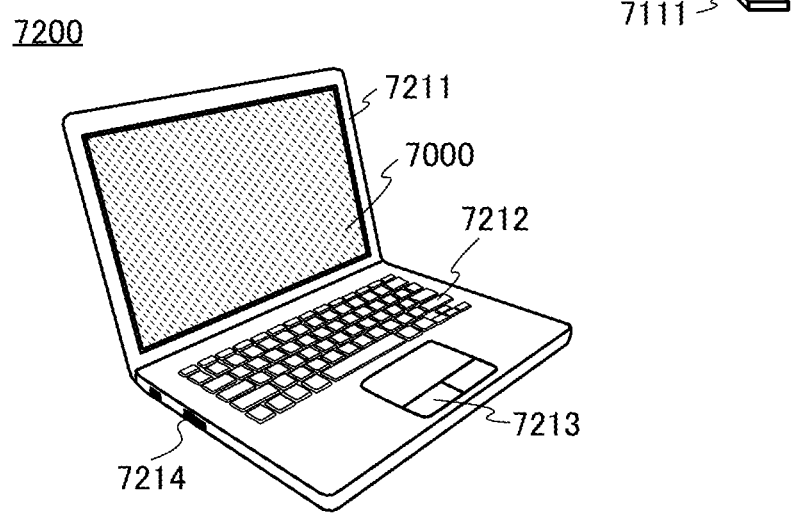

FIG. 16(B) illustrates a laptop personal computer 7200. The laptop personal computer 7200 includes a housing 7211, a keyboard 7212, a pointing device 7213, an external connection port 7214, and the like. In the housing 7211, the display portion 7000 is incorporated.

The display unit 20 of one embodiment of the present invention can be used for the display portion 7000 in FIG. 16(B).

Figure 16C:
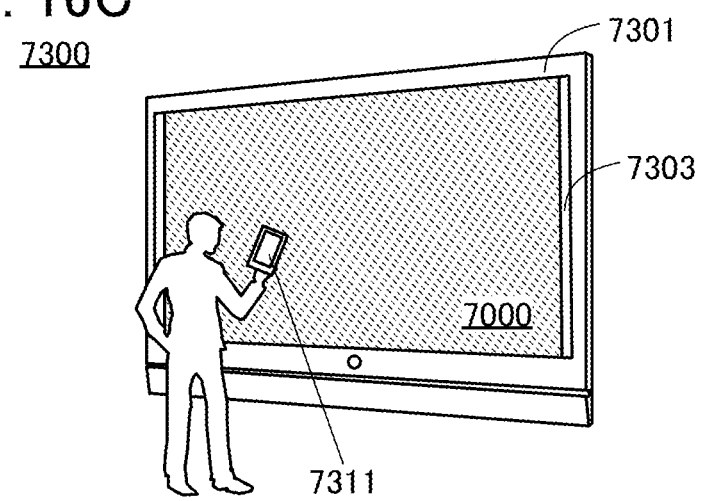

FIG. 16(C) illustrates an example of digital signage.

Digital signage 7300 illustrated in FIG. 16(C) includes a housing 7301, the display portion 7000, a speaker 7303, and the like. Furthermore, the digital signage can include an LED lamp, operation keys (including a power switch or an operation switch), a connection terminal, a variety of sensors, a microphone, and the like.

The display device 10 of one embodiment of the present invention can be used for the digital signage 7300 in FIG. 16(C).

The larger display portion 7000 can increase the amount of data that can be provided at a time. The larger display portion 7000 attracts more attention, so that the effectiveness of the advertisement can be increased, for example.

The use of a touch panel in the display portion 7000 is preferable because in addition to display of a still image or a moving image on the display portion 7000, intuitive operation by a user is possible. Moreover, for an application for providing information such as route information or traffic information, usability can be enhanced by intuitive operation.

Furthermore, as illustrated in FIG. 16(C), it is preferable that the digital signage 7300 work with a portable information terminal 7311 such as a smartphone a user has through wireless communication. For example, information of an advertisement displayed on the display portion 7000 can be displayed on a screen of the portable information terminal 7311. By operation of the portable information terminal 7311, display on the display portion 7000 can be switched.

Furthermore, it is possible to make the digital signage 7300 execute a game with use of the screen of the portable information terminal 7311 as an operation means (controller). Thus, an unspecified number of users can join in and enjoy the game concurrently.

Note that at least part of this embodiment can be implemented in combination with any of the other embodiments described in this specification as appropriate.

REFERENCE NUMERALS

CLK_IN1: clock signal input portion, CLK_IN2: clock signal input portion, DL_Y: source line, DL_1: source line, DLa1: source line, DLa2: source line, DLb1: source line, DLb2: source line, G0: signal, GL_X: gate line, GL_1: gate line, GL_2: gate line, S0: signal, 10: display device, 20: display unit, 21: pixel array, 22: source driver, 23: gate driver, 24: timing controller, 30: image receiving apparatus, 31: image processing circuit, 32: decoder, 33: front end portion, 34: input portion, 35: receiving portion, 36: interface, 37: control circuit, 41: remote controller, 51: pixel, 61: logic circuit portion, 62: output adjustment portion, 63: logic circuit portion, 64: output adjustment portion, 65: shift register, 71: clocked inverter, 74: clocked inverter, 75: inverter, 76: inverter, 501: pixel circuit, 502: pixel portion, 504: driver circuit portion, 504*a*: gate driver, 504*b*: source driver, 506: protection circuit, 507: terminal portion, 550: transistor, 552: transistor, 554: transistor, 560: capacitor, 562: capacitor, 570: liquid crystal element, 572: light-emitting element, 700: display unit, 700A: display unit, 701: substrate, 702: pixel portion, 704: source driver circuit portion, 705: substrate, 706: gate driver circuit portion, 708: FPC terminal portion, 710: signal line, 711: wiring portion, 712: sealant, 716: FPC, 721: source driver IC, 722: gate driver circuit, 723: FPC, 724: printed circuit board, 730: insulating film, 732: sealing film, 734: insulating film, 736: coloring film, 738: light-blocking film, 750: transistor, 752: transistor, 760: connection electrode, 770: planarization insulating film, 772: conductive film, 773: insulating film, 774: conductive film, 775: liquid crystal element, 776: liquid crystal layer, 778: structure body, 780: anisotropic conductive film, 782: light-emitting element, 786: EL layer, 788: conductive film, 790: capacitor, 791: touch panel, 792: insulating film, 793: electrode, 794: electrode, 795: insulating film, 796: electrode, 797: insulating film, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: portable information terminal

The invention claimed is:

1. A display unit comprising:
a pixel array;
a source driver; and
a gate driver,
wherein the pixel array comprises m×n pixels, m source lines, and n gate lines, each of m and n being an integer greater than or equal to 2,
wherein the source driver comprises a first logic circuit portion and a first selector,
wherein the gate driver comprises a second logic circuit portion and a second selector,
wherein the source driver is configured to output a signal to the m source lines,
wherein the gate driver is configured to output a signal to the n gate lines,
wherein image data for i×j pixels is input to the display unit, each of i and j being an integer greater than or equal to 2,
wherein in the case where i<m, the first selector is configured to output a same signal to at least two source lines, and
wherein in the case where j<n, the second selector is configured to output one of signals output from the second logic circuit portion, to a plurality of the gate lines.

2. The display unit according to claim 1, wherein in the case where i<m, the first logic circuit portion is operated at a lower operating frequency than in the case where i=m, and
wherein in the case where j<n, the second logic circuit portion is operated at a lower operating frequency than in the case where j=n.

3. The display unit according to claim 1, wherein in the case where i<m, the first logic circuit portion is operated at a lower power supply voltage than in the case where i=m, and
wherein in the case where j<n, the second logic circuit portion is operated at a lower power supply voltage than in the case where j=n.

4. The display unit according to claim 1, wherein the source driver comprises a first level shifter portion,
wherein the gate driver comprises a second level shifter portion,
wherein the first level shifter portion comprises first to kth level shifters, k being an integer greater than or equal to 2,
wherein the second level shifter portion comprises (k+1)th to lth level shifters, l being an integer greater than or equal to k+2,
wherein in the case where i<m, the first level shifter portion is operated using the level shifters different from the level shifters used in the case where i=m or the level shifters having a different combination from the level shifters used in the case where i=m, among the first to kth level shifters, and
in the case where j<n, the second level shifter portion is operated using the level shifters different from the level shifters used in the case where j=n or the level shifters having a different combination from the level shifters used in the case where j=n, among the (k+1)th to lth level shifters.

5. The display unit according to claim 1,
wherein the pixel comprises a transistor including a metal oxide in a channel formation region.

6. A display device comprising:
a display unit; and
an image receiving apparatus,
wherein the display unit comprises a pixel array, a source driver, and a gate driver,
wherein the source driver comprises a first logic circuit portion and a first selector,
wherein the gate driver comprises a second logic circuit portion and a second selector,
wherein the pixel array comprises m source lines and n gate lines, each of m and n being an integer greater than or equal to 2,
wherein the source driver is configured to output a signal to the m source lines,
wherein the gate driver is configured to output a signal to the n gate lines,
wherein the image receiving apparatus is configured to detect a resolution d of image data, and
wherein when the display unit is configured to display image data with a resolution e at maximum, in the case where image data where d<e is input to the image receiving apparatus, the first selector is configured to output a same signal to at least two source lines, and the second selector is configured to output one of signals output from the second logic circuit portion, to a plurality of the gate lines.

7. The display device according to claim 6, wherein in the case where image data where d<e is input to the image receiving apparatus, the first logic circuit portion and the second logic circuit portion are operated at a lower operating frequency than in the case where image data where d=e is input to the image receiving apparatus.

8. The display device according to claim 6, wherein in the case image data where d<e is input to the image receiving apparatus, the first logic circuit portion and the second logic circuit portion are operated at a lower power supply voltage than in the case where image data where d=e is input to the image receiving apparatus.

9. The display device according to claim 6, wherein the source driver comprises a first level shifter portion,
wherein the gate driver comprises a second level shifter portion,
wherein the first level shifter portion comprises first to kth level shifters, k being an integer greater than or equal to 2,
wherein the second level shifter portion comprises (k+1)th to lth level shifters, l being an integer greater than or equal to k+2, and
wherein in the case where d<e, the first level shifter portion is operated using the level shifters different from the level shifters used in the case where d=e or the level shifters having a different combination from the level shifters used in the case where d=e, among the first to kth level shifters, and the second level shifter portion is operated using the level shifters different from the level shifters used in the case where d=e or the level shifters having a different combination from the level shifters used in the case where d=e, among the (k+1)th to lth level shifters.

10. The display device according to claim 6, wherein the image receiving apparatus is configured to detect a frame frequency g of image data, and
wherein when the display unit is configured to display image data with a frame frequency f at maximum, in the case where image data where g<f is input to the image receiving apparatus, the first logic circuit portion and the second logic circuit portion are operated at a lower operating frequency than in the case where image data where g=f is input to the image receiving apparatus.

11. The display device according to claim 10, wherein in the case where image data where g<f is input to the image receiving apparatus, the first logic circuit portion and the second logic circuit portion are operated at a lower power supply voltage than in the case where image data where g=f is input to the image receiving apparatus.

12. The display device according to claim 6,
wherein the pixel comprises a transistor including a metal oxide in a channel formation region.

13. The display unit according to claim 1,
wherein the first selector includes a first switch,
wherein the second selector includes a second switch, and
wherein each of the first switch and the second switch includes a first input portion, a second input portion, and an output portion.

14. The display device according to claim 6,
wherein the first selector includes a first switch,
wherein the second selector includes a second switch, and
wherein each of the first switch and the second switch includes a first input portion, a second input portion, and an output portion.

* * * * *